(12) United States Patent
Lombardo

(10) Patent No.: US 8,171,387 B2
(45) Date of Patent: May 1, 2012

(54) METHOD OF AND SYSTEM FOR COLLABORATION WEB-BASED PUBLISHING

(75) Inventor: Thomas Edward Lombardo, Petaluma, CA (US)

(73) Assignee: Boardwalk Collaboration, Inc., San Francisco, CA (US)

( * ) Notice: Subject to any disclaimer, the term of this patent is extended or adjusted under 35 U.S.C. 154(b) by 1672 days.

(21) Appl. No.: 10/846,094

(22) Filed: May 13, 2004

(65) Prior Publication Data
US 2005/0257158 A1 Nov. 17, 2005

(51) Int. Cl.
*G06N 3/00* (2006.01)
(52) U.S. Cl. ....................................... 715/200
(58) Field of Classification Search .............. 715/234, 715/243, 254, 200
See application file for complete search history.

(56) References Cited

U.S. PATENT DOCUMENTS

| | | | | |
|---|---|---|---|---|
| 6,009,459 | A * | 12/1999 | Belfiore et al. | 709/203 |
| 6,028,605 | A | 2/2000 | Conrad et al. | 345/354 |
| 6,052,514 | A * | 4/2000 | Gill et al. | 715/733 |
| 6,308,188 | B1 * | 10/2001 | Bernardo et al. | 715/234 |
| 6,401,125 | B1 | 6/2002 | Makarios et al. | 709/229 |
| 6,446,113 | B1 | 9/2002 | Ozzie et al. | 709/204 |
| 6,449,627 | B1 * | 9/2002 | Baer et al. | 715/206 |
| 6,462,756 | B1 * | 10/2002 | Hansen et al. | 715/764 |
| 6,502,134 | B1 | 12/2002 | Makarios et al. | 709/225 |
| 6,553,365 | B1 | 4/2003 | Summerlin et al. | 707/2 |
| 6,553,402 | B1 | 4/2003 | Makarios et al. | 709/201 |
| 6,557,013 | B1 * | 4/2003 | Ziff et al. | 707/205 |
| 6,640,241 | B1 | 10/2003 | Ozzie et al. | 709/204 |
| 7,020,654 | B1 * | 3/2006 | Najmi | 1/1 |
| 7,076,494 | B1 * | 7/2006 | Baer et al. | 1/1 |
| 7,236,966 | B1 * | 6/2007 | Jackson et al. | 707/1 |
| 7,340,481 | B1 * | 3/2008 | Baer et al. | 1/1 |
| 7,356,766 | B1 * | 4/2008 | Baer et al. | 1/1 |
| 7,379,945 | B1 * | 5/2008 | Hirsch et al. | 1/1 |
| 7,401,097 | B1 * | 7/2008 | Baer et al. | 1/1 |
| 2002/0026314 | A1 * | 2/2002 | Nakao | 704/258 |
| 2003/0084138 | A1 | 5/2003 | Tavis et al. | 709/223 |
| 2003/0217105 | A1 | 11/2003 | Zircher et al. | 709/205 |
| 2003/0236820 | A1 | 12/2003 | Tierney et al. | 709/203 |
| 2004/0024820 | A1 | 2/2004 | Ozzie et al. | 709/205 |
| 2004/0083263 | A1 | 4/2004 | Richardson et al. | 709/204 |
| 2004/0148299 | A1 | 7/2004 | Teegan et al. | 707/100 |
| 2005/0027585 | A1 * | 2/2005 | Wodtke et al. | 705/9 |
| 2005/0060662 | A1 * | 3/2005 | Soares et al. | 715/810 |
| 2005/0197970 | A1 * | 9/2005 | Chehade et al. | 705/80 |

OTHER PUBLICATIONS

User's Manual for the Examiners Automated Search Tool (EAST) (Jul. 22, 1999).* Documentum 5 ECM Platform, "*Managing Content Across the Enterprise*", Documentum Inc., 6801 Koll Center Parkway, Pleasonton, CA 94566-7047, 4 pages.
Groove Networks-Groove for the Enterprise, "*Enterprise Solutions*"www.groove.net, Feb. 20, 2004, 3 pages.
Next Page, Inc. "*Folio*", www.nextpage.com, Feb. 20, 2004, 13 pages.

* cited by examiner

*Primary Examiner* — Kyle Stork
(74) *Attorney, Agent, or Firm* — Haverstock & Owens LLP

(57) ABSTRACT

A system and method directed to controlling work flow for a document is disclosed. The system comprises a document control module comprising a document engine and a document portion, a workflow control module for tracking and assigning work on the document portion, and a Web-based interface coupled to the document control module and the workflow control module. The system is configured to couple to a remote host over a network such as the Internet. Preferably, the document is automatically formatted to include XML tags, which allows the document to be searched and otherwise controlled more easily. Preferably, the system also comprises a search engine for searching through the document portion using a variety of search criteria. Preferably, the system is configured to import search results into the document.

52 Claims, 22 Drawing Sheets

Acme Router Company

Administrator's Home Page
Welcome, Ben!

| 205 New Book | Title 206 | Add 207 |

210 Add or Name Users  [Go] 211

215 Add "What's Up" Link — Link 220

Comment 221 — 222 / 223 [Add] 224

225 Current "What's Up" Links — 226 — 227 [Delete]

Library 230

| Title | Editor | Status | Due Date | 236 |
|---|---|---|---|---|
| 231→ 232 | 233 | □ 0% 234 | 235 | [Delete] |

People 240

| Name | Rank | Average Status |
|---|---|---|
| 241→ 242 | 243 | □ 0% 234 |

| Acme Router Company |
|---|

Administrator's Home Page
Welcome, Ben!

205 [New Book] [                Title                ]  206    [Add] 207

210 Add or Name Users  [Go] ~211

215 Add "What's Up" Link  [                                        ] ~220
Link
[                                                VV ⇧⇩] 222
Comment  ~221                                 223 [Add] 224

235 Current "What's Up" Links
http://www.important_vendor_site.com ~531    535  227 [Delete]
Check out what's going on in materials - interesting stuff on the horizon ~532
http://www.important_media_site.com ~541    540 [Delete]
Excellent overview of our competitors - all will be incorporated into the sales sheets
542  543

| Library 550 | | | | | |
|---|---|---|---|---|---|
| Title 551A 551B | | 552A (Editor | 553 Status | Due Date 554A | 554B |
| 550A► Installing Optical Router Model PT67  551 TOC | | Charlie | ▭▭■▭▭40% | 554 05/10/04 | [Delete] |
| 550B► Calibrating Optical Router Model PT67  TOC | | Bill | ▭▭▭■▭55% | 06/01/04 | [Delete] |
| 550C► Product Sales Sheets  TOC | | Ben | ▭▭▭▭■70% | 03/21/04 | [Delete] |
| 550D► Updates  TOC | | Charlie | ■▭▭▭▭10% | 07/10/04 | [Delete] |

| People 560 |
|---|

Name ~561           Rank              Average Status
Bill ~561A          Editor ~561B      ▭▭■▭▭30%
                                       561C

*Fig. 5*

Acme Router Company

Table of Contents
Welcome, Ben!

| Title | Calibrating Optical Router PT67 ~905 | | | | | |
|---|---|---|---|---|---|---|
| Element | Who | % Complete | Date Last Change | Comment Posted? | Feedback Request? | Aproved? |
| Chapter 1: Overview ~910A | Bill ~910B | 60% | 01/14/04 ~910C | No ~910D | No ~910E | No ~910F / No ~910G |
| Section 1.1: Calibration Objective | Jane | 80% | 01/10/04 | Yes | No | No |
| Sub-Section 1.1.1: Assessing Needs | Bill | 20% | 01/16/04 | No | No | No |
| Sub-Section 1.1.2: Optimizing Performance | Charlie | 70% | 01/11/04 | Yes | No | No |
| Section 1.2: Initial Settings ~930A | Jane ~930B | 30% ~930C | 01/08/04 | Yes ~930D | Yes ~930E | No ~930F / No ~930G |
| Sub-Section 1.2.1: Understanding the Controls | Charlie | 40% | 01/16/04 | No | No | Yes |
| Sub-Section 1.2.2: Making Projections | Bill | 100 | 01/12/04 | No | No | No |
| Chapter 2: Initial Testing | Matt | 75% | 01/06/04 | Yes | No | No |
| Section 2.1: Determine Initial Conditions | Matt | 50% | 01/07/04 | No | No | No |
| Sub-Section 2.1.1: Input Strength | Matt | 40% | 01/12/04 | Yes | Yes | No |
| Sub-Section 2.1.2: Input Clarity | | 60% | 01/15/04 | Yes | | No |
| | | Average 55% | | | % Finished | 9% |

960 → 960A [Go to TOC]  960B [Preview]  960C [Save As]  [Make Live for Searches] 960D 970 → ☐ PFD 970A  ☐ Rich Text Format 970B  ☐ HTML 970F [Publish]  ☐ XML 970D / 970C

*Fig. 9*

Acme Router Company

Writer's Home Page
Welcome, Matt!

1210 — [What's Up]
http://www.important_vendor_site.com
Check out what's going on in materials - interesting stuff on the horizon.

http://wwww.important_media_site.com
Excellent overview of our competitors - all will be incorporated into the sales sheets

[Title] Calibrating Optical Router PT67

| Element | Who | % Complete | Date Last Change | Comment Posted? | Feedback Request? | Aproved? |
|---|---|---|---|---|---|---|
| Chapter 1: Overview | | | | | | |
| Section 1.1: Calibration Objective | Bill | 60% | 01/14/04 | No | No | No |
| Sub-Section 1.1.1: Assessing Needs | Jane | 80% | 01/10/04 | Yes | Yes | No |
| 1220 → Sub-Section 1.1.2: Optimizing Performance | Bill | 20% | 01/16/04 | No | No | No |
| Section 1.2: Initial Settings | Matt | 70% | 01/11/04 | Yes | Yes | No |
| Sub-Section 1.2.1: Understanding the Controls | Jane | 30% | 01/08/04 | Yes | No | No |
| Sub-Section 1.2.2: Making Projections | Matt | 40% | 01/16/04 | No | No | No |
| | Bill | 100 | 01/12/04 | No 1222E | Yes 1222F | Yes |
| 1222 → Chapter 2: Initial Testing — 1222A 1222B | Matt | 75% | 01/06/04 | Yes | No | No 1222G |
| Section 2.1: Determine Initial Conditions | Bill | 50% | 01/07/04 | No | Yes | No |
| Sub-Section 2.1.1: Input Strength | Charlie | 40% | 01/12/04 | Yes | No | No |
| Sub-Section 2.1.2: Input Clarity | Charlie | 60% | 01/15/04 | Yes | No | No |
| | | Average 55% | 1222C 1222D | | % Finished | 9% |

*Fig. 12*

```
                                                                    1500
┌─────────────────────────────────────────────────────────────────────┐
│                      Acme Router Company                            │
└─────────────────────────────────────────────────────────────────────┘
                         Table of Contents
                         Welcome, Ben!
─────────────────────────────────────────────────────────────────────
Calibrating Optical Router PT67                          1302—TOC
```

Chapter Two: Initial Testing                   Status  75%

1525 — A key differentiator for the OptiStar EdgeSwitch is its Domain Virtualized which allows data center operators to better utilize SAN resources and in scalability. reliability, interoperability, manageability and security d SAN operations. Domain Virtualization technology provides the ability to and route storage traffic between separate SAN fabrics, thereby making create ever larger distributed SANs while minimizing potentially disrupt; traffic.

The OptiStar EdgeSwitch offers built-in, integrated IP routing functional you to interconnect storage resources across multiple sides in a point-to fashion without requiring additional router platforms in the network. The connect more data centers over greater distances, while improving network potentially reducing data center costs.

Cost saving can also result from the integration of mulitple networking single platform at the edge of the data center, compared to other solution require up to four separate network elements in order to archieve the same the OptiStar EdgeSwitch can support a simpler, flatter solution architect hardware components, customers can benefit from lower capital and operat:

1509 — Image: Photo of Back of Optical Router PT67

Format highlighted text:  [B] [*I*] [U]

1530 {
[Insert Image]   [Insert Table]                    [Spell Check]
[Insert Footnote] [Attach File]                    [Save/Preview Chapter]
                                                   [Save]

1550 { Images:
        Photo of Book of Optical Router PT67

Comment from Bill: We should change switch A to an optical switch since this would increase the speed of our product.

New Comment: [                                    ]

*Fig. 15*    To: [Select ⇩] [Post] —1567
                 ⌄1546

[ Table Gallery ] [ Build Your Own Table ]     1600

Add table > Build Your Own Table

Build your own table

To build your own table select the table properties below then click return to your web page. You will then have the option to add content including text, pictures or Web Gems.

1610

| | |
|---|---|
| Number of Columns: | Choose how many columns your table will have. [2 ▼] |
| Number of rows: | Choose how many rows your table will have. [2 ▼] |
| Table border: | The table border will show a line around your table. Set border width to: [1 ▼] Table border color: ☐ Select another color |
| Cellpadding: | This will add space between the table border and the [4 ▼] |
| Cell border: | Cell border will add a line between each table cell<br>[▼] Show Cell Border<br>Cell border color: ☐ Select another color |
| Table width: | Select the table width. [100% ▼] |

[ Done ]

Attached Files:
Cisco Whitepaper on Router Configuration —— 1620

1530
- Format highlighted text: [B] [*I*] [U]
- [Insert Image]  [Insert Table]
- [Insert Footnote]
- [Spell Check]
- [Save/Preview Chapter]
- [Save]

Comment from Bill: | We should change switch A to an optical switch since this would increase the speed of our product.
1540

New Comment: | [                    ]
1545

To: [ Select ▼ ] [ Post ]
    1540         1547

| Acme Router Company |
|---|

Search Page
Welcome, Anyone!

| With all the words | Optimal input strength |
| With the exact phrase | |
| With at least one of the words | |
| Without the words | |

| Date range | ☐ Any time |
| | [x] Last three months |
| | ☐ Last year |
| Return | ☐ Book |
| | [x] Chapter |
| | ☐ Section |
| | ☐ Sub-Section |
| Search Area | [x] All Text |
| | ☐ Only headings |
| | ☐ Only Images |
| | ☐ Only Tables |
| Authored By | [x] Anyone |
| | ☐ Administrator [Select ▽] |
| | ☐ Editor [Select ▽] 1908 |
| | ☐ Writer [Select ▽] [Search] |
| | [Publish Booklet] |
| | 1910 |

*Fig. 19*

2100

| 2101 | <book> | Calibrating Optical Router PT67 |
|---|---|---|
| 2102 | <chapter> | Chapter 1: Overview |
| 2103 | <image> | Schematic of router |
| 2104 | <section> | Section 1.1: Calibration Objectives |
| 2105 | <Sub_Section> | Sub-Section 1.1.1: Assessing Needs |
| 2106 | <footnote> | *Good Book About Fiber Optics* |
| 2107 | <Sub_Section> | Sub-Section 1.1.2: Optimizing Performance |
| 2108 | <section> | Sub-Section 1.2: Initial Settings |
| 2109 | <Sub_Section> | Sub-Section 1.2.1: Understanding the Controls |
| 2110 | <Sub_Section> | Sub-Section 1.2.2: Making Projections |
| 2111 | <Table> | Charateristics of Optic Data |
| 2112 | <chapter> | Chapter 2: Initial Testing |
| 2113 | <section> | Sub-Section 2.1: Determine Initial Conditions |
| 2114 | <sub_section> | Sub-Section 2.1.2: Input Clarity |
| 2115 | <images> | Causes of Interference |
| 2116 | <footnote> | *Book Containing the Interference Image* |
| 2117 | <sub_section> | Sub-Section 2.1.2: Input Strength |
| 2118 | <date_published> | |
| 2119 | <administrator> | |
| 2120 | <editor> | |
| 2121 | <writer> | |
| 2122 | <writer> | |
| 2123 | <writer> | |

Table 1

*Fig. 21*

METHOD OF AND SYSTEM FOR COLLABORATION WEB-BASED PUBLISHING

FIELD OF THE INVENTION

This invention relates to electronic documents. More particularly, this invention relates to electronic documents having a single interface that allows a user to modify, track, publish, search through, and import content into the electronic documents.

BACKGROUND OF THE INVENTION

Many projects, given their size and complexity, require the collaboration of many individuals. A product installation manual, for example, has many sections, each having detailed specifications for the product. Each section may be edited by one or more individuals knowledgeable in the material contained in the section. Coordinating and tracking work on the documents is generally referred to as "product work flow."

In one prior art system, company employees can check-out a document to work on it and then check it back in when done. The system tracks the changes everyone makes, a method called versioning. The system sends e-mail alerts to let others know of the changes. The system may also include a separate message board where employees can talk about the document. When the document is finished, it may be locked by an administrator and made available for searches on the company's intranet.

This prior art system integrates Microsoft Outlook™, Microsoft Word™, a server-based document repository, a server-based full-text search engine, a message board, and some type of project management or workflow application. The system may also include reporting tools that will read through the communications and present the administrator with various statistics.

This system has several drawbacks. First, information is contained in Word documents. Search queries among a number of documents tell users which documents contain the search terms, but the queries do not tell the user where in the document the search terms are found. The user must still look through each document to determine where the search terms are located. Second the documents are not easily accessible to multiple users, especially those at remote locations such as customer sites. Third, the documents cannot be easily or quickly edited and reformatted for display.

SUMMARY OF THE INVENTION

Embodiments of the present invention include a method of and a system for generating, organizing, editing, and searching through an electronic document. The embodiments provide a Web-based graphical user interface to the document, allowing users from remote locations to quickly and easily access the document. The embodiments also provide an easy way to assign sections of the document for users to work on, and a way to track the progress on those sections. The embodiments allow the document to be published in a variety of formats.

In accordance with a first aspect of the present invention, a system comprises a document control module comprising a document engine and a document portion; a workflow control module for tracking and assigning work on the document portion; and a Web-based interface coupled to the document control module and the workflow control module. The workflow control module provides a plurality of sets of functions to be performed on the document portion, each set of functions corresponding to a type of user. Preferably, a first type of user has a corresponding first set of functions, the first set of functions comprising adding a user to the system, adding a book to the system, and assigning work to a user. A second type of user has a corresponding second set of functions, the second set of functions comprising assigning work to a user, creating a chapter in a book, and creating sections in the chapter. A third type of user has a corresponding third set of functions, the third set of functions comprising editing a section of the book and reporting a completion status for work on the section of the book.

Preferably, the workflow control module comprises a plurality of panels, each panel associated with a workflow for one or more sections of the document portion. A first panel from the plurality of panels contains an identifier corresponding to the location of a second panel from the plurality of panels.

In other embodiments, the identifier comprises a link to the second panel. Preferably, the first panel comprises a first Web page, the second panel comprises a second Web page, and the link comprises a uniform resource locator for the second Web page. In another embodiment, the document portion comprises markers corresponding to headings within the document portion. The markers comprise Standard Generalized Markup Language (SGML) tags, such as eXtensible Markup Language (XML) or Hypertext Markup Language (HTML) tags. Alternatively, the markers are Rich Text Format (RTF) control words. The document control engine comprises a formatting engine configured to automatically embed the markers within the document portion in response to an input from the Web-based interface.

In other embodiments, the system further comprises a host coupled to the Web-based interface. A Web browser executes on the host. The host is coupled to the Web-based interface over a local area network or over a wide area network such as the Internet. Alternatively, the host is coupled to the Web-based interface over a secure channel such as a virtual private network.

In other embodiments, the document control engine is configured to import an object into the document portion in response to a command received on the Web-based interface. The object is one of a sound file, an image file, a table, and a video clip.

In other embodiments, the workflow control module comprises a Library area containing a book identifier, a corresponding status display, and a corresponding due date. The workflow control module also comprises a Book Overview panel containing a plurality of entries, each entry having a title area, an owner area, and a status area. The status area contains a completion percentage area. The document control module comprises a publishing engine configured to publish the document portion in a selected format. The selected format is one of Portable Document Format (PDF), Rich Text Format, HTML, and XML.

In other embodiments, one of the plurality of panels comprises a comment field. The document control engine further comprises a search engine configured to search within the document portion for a target using search criteria. The search criteria comprises at least one of a date range, a search term, a search area, a user type, and a user identity. The user type is one of an administrator, an editor, and a writer. Preferably, the search engine is configured to display a location within the document portion where the search term is found. The search engine is configured to display markers and text corresponding to the location of search terms within the document portion. The markers correspond to headings within the document portion.

In other embodiments, the headings correspond to at least one of a book heading, a chapter heading, a section heading, and a sub-section heading of a book. The search area is one of text, a heading, an image, and a table. The document control module is configured to import the result of one or more searches directly into the document portion. The Web-based interface is configured to allow both a primary user and a secondary user to access the search engine. The system is configured to collect one or more results of searches into a booklet, to format the booklet, and to transmit the formatted booklet to a host computer. Preferably, the booklet is formatted as a PDF file.

In accordance with a second aspect of the present invention, a system comprises a document control module comprising a document engine and a document portion; a workflow control module for tracking and assigning work on the document portion, the workflow control module comprising a communications module for communication workflow information; a Web-based interface coupled to the document control module and the workflow control module; and a host coupled to the Web-based interface over a network.

In accordance with a third aspect of the invention, a method of controlling workflow related to a document comprises accessing the document using a Web-based interface and using the Web-based interface to perform one of tracking a status relating to a completion of a section of the document, updating the status, and editing the document.

In accordance with a fourth aspect of the invention, a graphical user interface comprises a first panel displaying headings, work assignments, and status of sections of a document; a second panel coupled to the first panel, the second panel containing a link to a section of the document; and a third panel for displaying the section of the document, the third panel configured for editing the section of the document. The first panel, the second panel, and the third panel are all accessible to a host over a Web-based interface.

BRIEF DESCRIPTION OF THE DRAWINGS

FIG. 2 is a screen shot of an Administrator's Home page in accordance with one embodiment of the present invention.

FIG. 5 is a screen shot of the Administrator Home page of FIG. 2, with additional book titles, in accordance with one embodiment of the present invention.

FIG. 9 is a screen shot of a Book Overview page in accordance with one embodiment of the present invention.

FIG. 12 is a screen shot of a Writer's Home page in accordance with one embodiment of the present invention.

FIG. 15 is a screen shot of the Writing page shown in FIG. 13, with an embedded image in accordance with one embodiment of the present invention.

FIG. 16 is a screen shot of the Writing page shown in FIG. 13, with a pop-up of a Table Creation interface, in accordance with one embodiment of the present invention.

FIG. 19 is a screen shot of a Search page from which a secondary user searches within documents in a system library.

FIG. 21 contains a table containing XML tags used to store documents in accordance with one embodiment of the present invention.

DETAILED DESCRIPTION OF THE INVENTION

Figure 1:
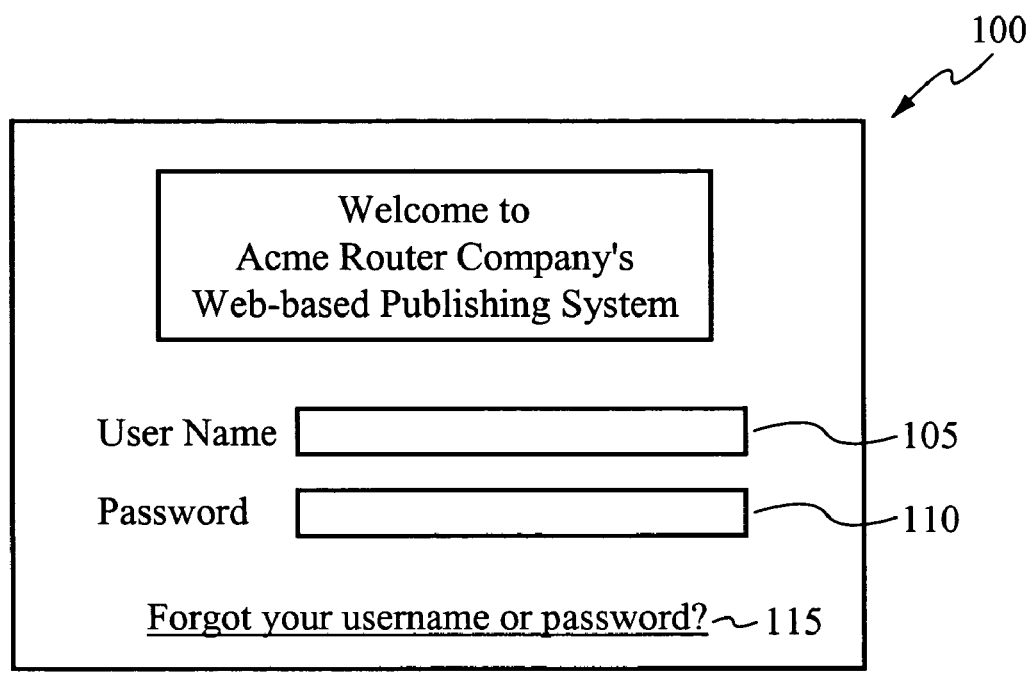
FIG. 1 is a user log-in screen in accordance with one embodiment of the present invention.

The present invention allows users to more efficiently collaborate on documents, producing documents that are more accurate, more easily updated, and more accessible. For example, in accordance with the present invention, company field engineers are able to quickly view product service manuals from customer sites. Using a single interface, the field engineers are able to access the service manuals; they are able to quickly search through the manuals for key terms, helping them to quickly troubleshoot malfunctioning products; they are able to exchange messages about the manual; they are able to update the manual to reflect product information discovered in the field; and they are able to generate new service manuals, specifically tailored to a particular customer product. These and other advantages are achieved by the embodiments of the present invention.

As used below, manuals and other documents generated in accordance with the present invention are referred to as "books." As used herein "books" refers to electronic documents of many types, such as electronic manuals, electronic research papers, and the like. "Book" refers to any document that includes but is not limited to text, images, workflow and tracking statistics, and other data about the book. The book also optionally contains formatting tags including but not limited to Hyper Text Markup Language (HTML) tags, Extensible Markup Language (XML) tags, other meta tags, as well as words used for formatting such as those embedded with rich text format (RTF) documents. It will be appreciated that books can be of any length and complexity. For example, a book can be a single-page text document, such as a paper describing one feature of a product. Alternatively, a book can be a thousand-page document describing a product in detail and containing XML tags marking section headings, such as chapter headings, paragraph headings, and footnotes. Preferably, the book is stored in discrete parts in location as an XML file or in a structured query language (SQL) database.

A system in accordance with one embodiment of the present invention allows users to log on to the system using a Web based interface to access one or more books. The system also allows users to write sections of the books, organize sections of the books, track the progress of persons working (editing) sections of the books, set completion due dates for sections of the books, assign the editing of sections to people within an organization, add to the book links to Web sites that users may be interested in, exchange comments about sections of the books, search within the books, embed objects within the books, including but not limited to text files, still images, moving video clips, tables, footnotes, and the results of searches. The system also allows users to publish portions of the books, exporting text, images, tables, and footnotes. Books can be published in a variety of formats to fit the situation at hand. For example, a user may wish to publish a PDF version of the book for easy printing. Alternatively, a user may wish to publish an HTML version of a book for display on a Web site.

In accordance with one embodiment of the present invention, the system allows various types of users with various privileges. For example, an Administrator oversees the system and accordingly has the most extensive privileges. Among other privileges, the Administrator has the ability to add a new book to the system, assign an Editor to a book, input new chapters and sections to a book, make books searchable, check the work progress for specific individuals, and add links to information of specific interest to individuals working on a project. An Editor has fewer privileges than an Administrator. And a Writer has even fewer privileges, being able only to view sections of the book that he is working on. As used herein, the term "user" is used to refer to Administrators, Editors, and Writers.

FIG. 1 shows a graphical user interface (GUI) log-in screen 100, having a user name input field 105, a password input field 110, and a reminder link 115 that takes the user to a Help Web page (not shown) that helps him remember his password. A user logging in from a customer site would reach the log-in screen after loading the Web page on a host at the customer site. The Help Web page may contain a hint, it may e-mail the password to a secure account where the user can read it, or it may provide other means to help the user log on. In a preferred embodiment, the user's identity will determine what functions he is able to perform on documents and other files within the system. It will be appreciated that if the user's login information does not match an entry in the login database, the user will not be allowed access to the system.

Preferably, the log-in screen is a Web page that the user accesses from a remote location, such as over a wide area network coupling a host at a customer site with a host on which the system of the present invention executes. Preferably, the remote host executes a Web client that allows the user to communicate with a Web-server that forms part of the system. It will be appreciated that in other embodiments the system runs on multiple hosts comprising a Web server and a back-end database containing books, a login database, other programs and data, or any combination of these. Preferably, the back-end database or another back-end database also stores a list of users allowed access to the system, their passwords, their status (Administrator, Editor, or Writer). It will be appreciated that other configurations can be used in accordance with the present invention. Preferably the wide area network comprises a secure channel such as a virtual private network (VPN) on the Internet. It will be appreciated that other channels can be used, such as non-secure Internet connections, local area networks, wireless networks, or any other connection. Preferably, the system is configured to couple with the host over connections automatically established by handshaking protocols or by parameters set within the system or the remote host.

It will also be appreciated that information such as log in screens can be presented to a user using panels other than Web pages. As used herein, a panel is a frame of data presented to a user on an electronic display using any one of a variety of formats. Thus, for example, in one embodiment a panel is a Web page displaying a user screen such as a login screen.

In the preferred embodiment, after an Administrator has successfully logged on, he is brought to the Administrator Home Page 200, shown in FIG. 2. The Administrator Home Page 200 contains (a) a New Book area 205 having a Title field 206 and an associated Add button 207, (b) an Add or Name Users area 210 having a Go button 211, (c) an Add "What's Up" Link area 215 having a Link field 220, a Comment field 221 with an associated Up arrow 222 and a Down arrow 223, and an Add button 224, (d) a Current "What's Up" Links area 225 having a Link field 226 and a Delete button 227, (e) a Library area 230 having a first entry 231, the first entry 231 having a Title field 232, an Editor field 233, a Status bar 234, a Due Date field 235, and a corresponding Delete button 236, and (f) a People area 240 having a first entry 241, the first entry 241 having a Name field 242, a Rank field 243, and an Average Status bar 244. Each of these areas is discussed in more detail below.

It will be appreciated that other users of the system, Editors and Writers, will be brought to a screen different from that shown in FIG. 2. The screen shown Editors and Writers will display only those functions for which the Editors and Writers have privileges. For example, a screen displayed to a Writer who has just logged on will not allow the Writer to add users as provided by the Go button 211 in the Add or Name Users area 210.

As used herein, a Web page refers to any document that can be displayed by a Web browser. In accordance with embodiments of the present invention, a Web page includes but is not limited to (1) a static document, generated once so that a copy of it is transmitted to a client that accesses it, (2) a dynamic document, generated by an application program running on the Web server when a Web browser requests the document, or (3) an active document, generated by an application program running on a client host. It will be appreciated that the contents of dynamic and active documents are determined by any number of criteria including, but not limited to, the identity of the user requesting the document, the parameters sent as part of the request, and the time of day. Thus, as described in more detail in some of the examples below, when a user accesses a portion of a book, the book's table of contents is automatically generated and displayed to the user. The table of contents constantly changes throughout the document generation process, as chapters are added and deleted, and other sections of the book are updated. The table of contents thus cannot be stored as a static document. Preferably, Web pages, such as tables of contents, are generated at a central location such as a Web server. It will be appreciated, however, that in accordance with the present invention Web pages can be generated on client hosts (e.g., remote locations from which a field engineer is working) or at other locations.

As used herein, the term "identifier" refers to any means for identifying an object, such as a user, a book title, or an interesting article. Similarly, "heading" refers to an identifier for a book, chapter, section, and subsection. In one embodiment, a heading is a title. Preferably, an identifier refers to a URL for a particular object. For example, a user identifier refers to a URL link to a user's home Web page. In the drawings for this specification, underlined elements denote URL links. Thus, the user identifier Bill refers to a URL for a Web page. When a page is displayed using a Web browser and a user selects the element Bill, the URL contained in the link Bill will be automatically loaded and the corresponding Web page generated, if necessary, and displayed. Web pages can also contain embedded references to other Web pages. As used herein, an element can be "selected" by navigating a cursor over the element and then clicking on a mouse button. Alternatively, an element can be selected by touching it such as when it is displayed on a touch-sensitive screen. It will be appreciated that elements can be selected in other ways.

In operation, an Administrator is able to activate the Title field 206 and enter the title of a new book. When the Administrator enters the title and selects the Add button 207, a new book with the title is automatically created. It will be appreciated that any field such as the Title field 206 is activated by positioning a cursor within the field and selecting the field such as by clicking the button on a mouse.

Still referring to FIG. 2, after the Administrator has entered a title in the Title Field 206 and clicked on the Add button 207, he can scroll to any other field within the Administrator Home Page 200. Preferably, if the Administrator wishes to add the names of users already in the system or to add the names of new users, he presses the Go button 211, which brings the user to the Add User Page 300 shown in FIG. 3 and discussed below. The Administrator may do this to allow the new users to access the system. The Administrator then has the ability to assign work and grant other privileges to these new users. If the Administrator wishes to add a User Resource Location (URL) link that visitors to the book may find interesting, he activates that Link field 220 and inputs a URL. In addition, the Administrator can also input a comment into the Comment field 221, for example, explaining what can be found at the Web page addressed by the URL in the Link field 220. The Administrator can scroll up or down within the Comment field 221 by using the Up arrow button 222 or the down arrow button 223, respectively. After editing the URL in the Link field 221, the comments in the Comment field 222, or both, the user is able to add both to the book by selecting the Add button 224.

The Administrator can also view current links in the Current "What's Up" Links area 225. These links will appear at the top of the Writers' home pages and contain links to resources on the Internet or Intranet that a manger wants everyone to read. An Administrator or Editor can highlight a link in the Link sub-field 226 (none are shown here) and then delete it by selecting the Delete button 227. When a user clicks on the Add button 224, the page reloads and the What's Up link appears in the Current "What's Up" Links area 225. When a user selects the delete button 227, the page reloads without the What's Up link on it anymore.

Within the Library area 230, the user is able to view the status of the book having the title in the Title field 232, the editor whose name appears in the Editor field 233, the status in the Status bar 234, and the due date in the Due Date sub-field 235. The user is able to delete this book from the library by selecting the Delete button 236. As described in more detail below, the Library area 230 contains a list of books in the system and status for each book.

Finally, the user is able to view the progress of each person working on the book. As one example, using the fields shown in FIG. 2, the user with the name Bill Smith in the Name field 242, has the rank 12, as would be shown in the Rank field 243, an average status of 15%, as would be shown by the Average Status bar 234.

It will be appreciated that while FIG. 2 has described a user sequentially accessing the areas, New Book area 205, Add or Name Users area 210, Add "What's Up" link area 215, Current "What's Up" Links area 225, Library area 230, and People area 240, a user is able to access any number of fields or areas in any order.

Figure 3:
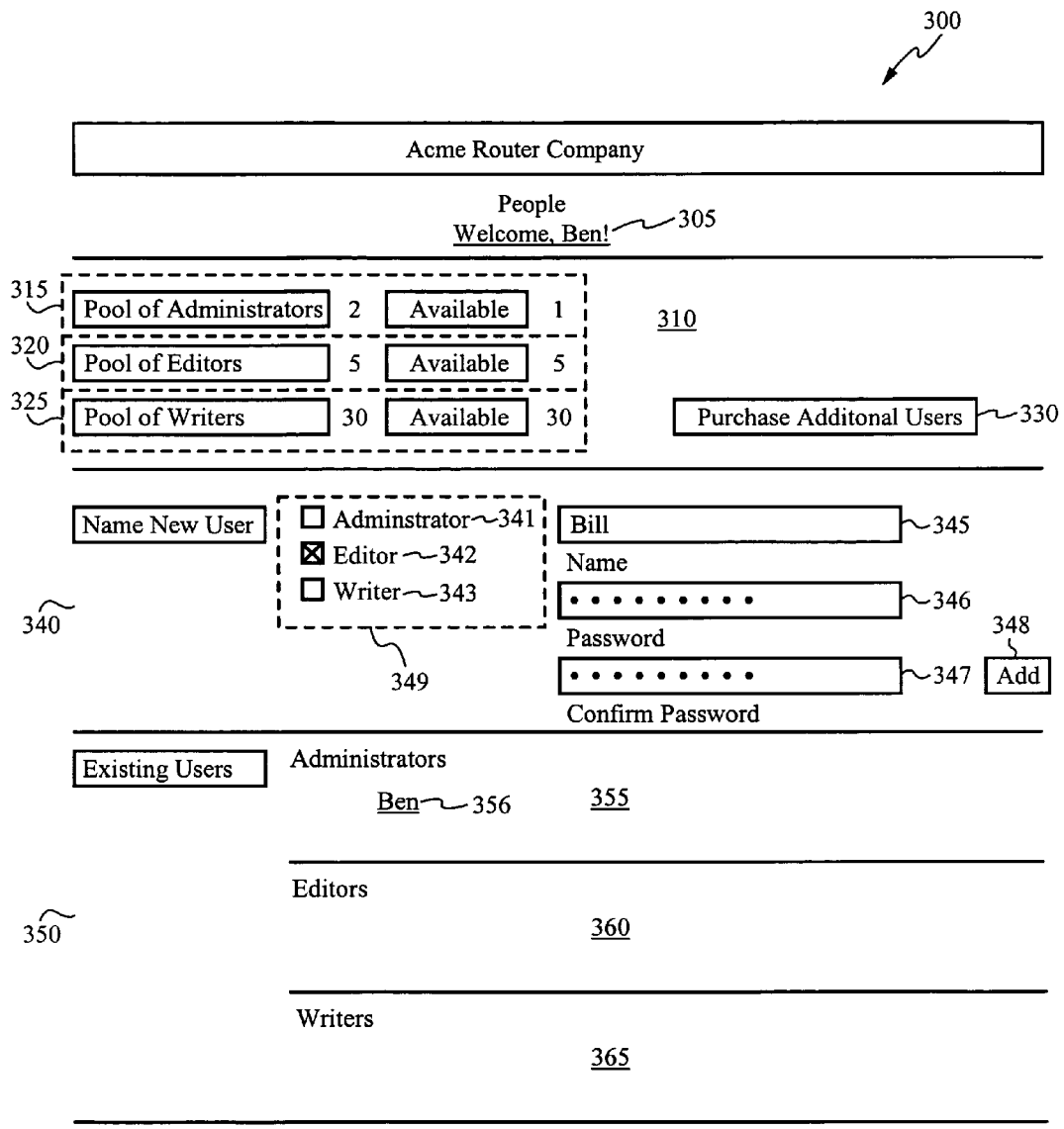
FIG. 3 is a screen shot of an Administrator's Home page in accordance with one embodiment of the present invention.

FIG. 3 shows an Add or Name Users page 300, in accordance with one embodiment of the present invention, which the user is taken to when he selects Go button 211 of FIG. 2. The Add or Name Users page 300 contains a User Home link 305, a User Summary Section 310, a Name New User section 340, and an Existing Users section 350. The Home link 305 is a URL that when selected takes a user back to his Home page. Preferably, each user has a Home page with a format dependent on the user type. For example, in one embodiment, an Administrator's Home page lists the projects within the system and the status of each; a Writer's Home lists the projects he is currently working on and the status for each.

The User Summary Section 310 has (1) a first line 315 displaying the Pool of Administrators (here, 2) and the number of available Administrators in the Pool (here, 1), (2) a second line 320 displaying the Pool of Editors 331 (here, 5) and the number of available Editors (here, 5), (3) a third line 325 displaying the Pool of Writers (here, 30) and the number of available Writers (here, 30), and (4) a Purchase Additional Users button 330, which when selected allows additional users. Dashed lines in the User Summary Section 310 and throughout the following explanations are shown for readability and generally are not displayed in the User Summary Section 310. In a preferred embodiment, the system is configured to support a predetermined number of administrators, editors, and writers. If a company licensing the system desires more, it is charged an amount related to the type of additional users requested.

In the Name New User section 340, a User Type field 349 contains check boxes next to each type of user. The User Type field 349 contains a check box 341 associated with an Administrator, a check box 342 associated with an Editor, and a check box 343 associated with a writer. The Name New User area 340 also contains a Name field 345, a Password Field 346, and a Confirm Password Field 347. For the example shown in FIG. 3, the check box 342 has been checked, indicating that the new user is an editor. The user has the name "Bill", entered into the Name field 345. A password is entered into the Password field 346 and reentered, to confirm the password, into the Confirm Password field 347. As shown in FIG. 3, for security, the password preferably is not echoed when typed into either the Password field 346 or the Confirm Password field 347. After a user has checked one of the check boxes 341, 342, and 343, and input the name and password into the Name field 344, the Password field 346, and the Confirm Password field 347, the user selects the Add button 348 to add the new user to the system.

The Existing Users area 350 displays information about the users existing in the system database. The Existing Users area 350 contains an Administrators area 355, an Editors area 360, and a Writers area 365. The Existing Users area 350 shows that there is only one Administrator currently in the system, denoted by a user identifier, the link "Ben" 356. Preferably, the link "Ben" 356 indicates the name of the user and also provides a link to the user's Home page. Because the Editors area 360 contains no links, no editors are currently recognized by the system (e.g., not stored in a user database). Similarly, because the Writers area 365 contains no links, there are no writers currently in the system.

Figure 4:
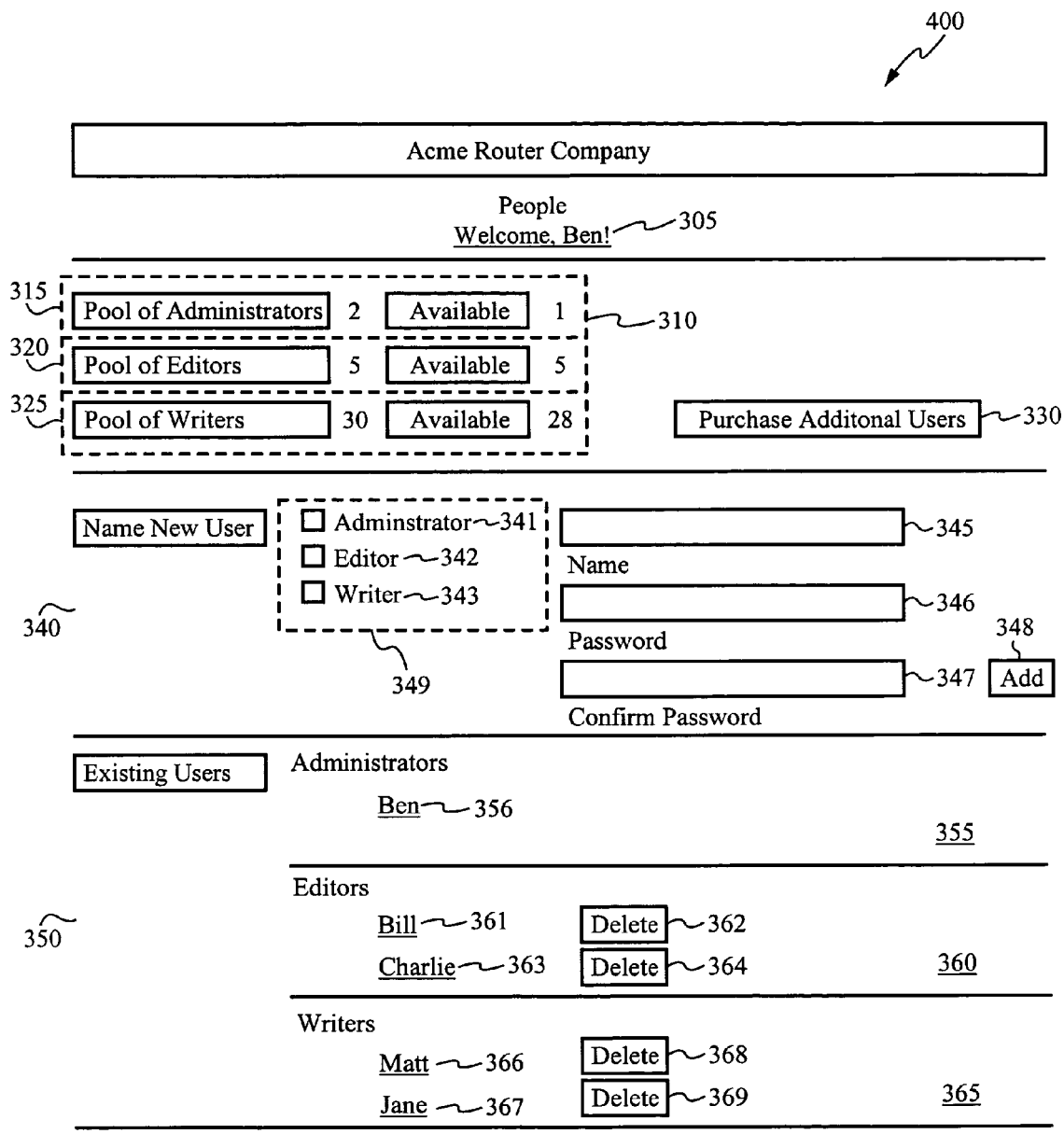
FIG. 4 is a screen shot of the Administrator's Home page of FIG. 3, with additional editors and writers added, in accordance with one embodiment of the present invention.

FIG. 4 shows an Add or Name Users page 400, which is the Add or Name Users page 300 after editors have been added to the Editors area 360 and writers have been added to the Writers area 365. Identical numbers in the figures refer to the same element. In the exemplary Add or Name Users page 400 shown in FIG. 4, within the Editors area 360, a user identifier "Bill" 361 and its associated Delete key 362, and a user identifier "Charlie" 363 and its associated Delete key 364 have been added. Within the Writers area 365, a user identifier "Matt" 366 and its associated Delete key 368 and a user identifier "Jane" and its associated Delete key 369 have been added.

FIG. 5 shows the Administrator's Home page 500, in accordance with an embodiment of the present invention, after books have been added to it. The Administrator' Home page 500 differs from the Administrator's Home page 200 in that it has modified "Current 'What's Up' Links" area 235, Library area 550, and People area 560. The Current "What's Up" Links area now contains a first area 535 and a second area 540. The first area 535 contains a link http://www.important_vendor_site.com 531, a comment 532, and a Delete key 533. The second area 540 contains a link http://www.important_media_site.com 541, a comment 542, and an associated Delete key 543. The information contained in the first area 535 and the second area 540 were added by entering the information into the appropriate fields in the Add "What's Up" Link area 215 and selecting the Add key 224.

The Library area 550 contains a plurality of entries 550A, 550B, 550C, and 550D. The entry 550A has a Title area 551, an Editor area 552, a Status area 553, and a Due Date area 554. The Title area 551 contains a title identifier 551A and a table of contents (TOC) link 551B. Preferably, the title identifier 551A and the TOC link 551B are both URLs, each containing the address of a Web page on the VPN. As shown in FIG. 5, the title identifier 551A has the URL "Installing Optical Router Model PT67" and the table of contents identifier 551B has the URL "TOC". The Editor area 552 contains the text "Charlie". The Status area 553 contains a display indicating that the book titled "Installing Optical Router Model PT67" is 40% complete. The Due Date area 554 contains text 554A displaying that the due date is May 10, 2004 and also contains a Delete button 554B.

Similarly, the People area 560 contains one entry 560A having a Name field 561 containing the user identifier "Bill" 561A, a Rank field 561B containing the text "Editor", thereby identifying the user "Bill" as an editor, and an average status field 561C, containing a status bar indicating that the average status for all the projects that Bill is working on is 30% complete.

Figure 6:
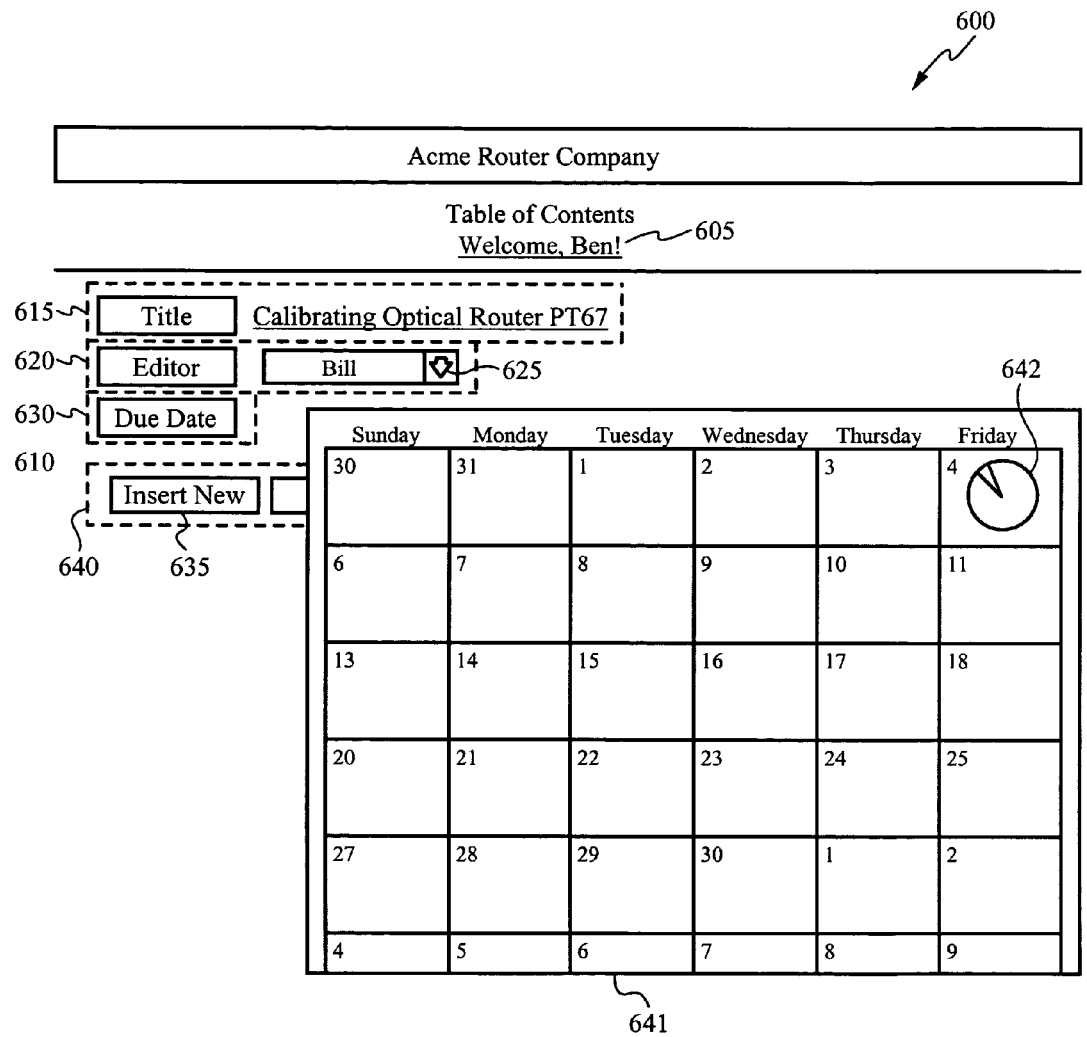
FIG. 6 is a screen shot of a calendar for the completion of a book in accordance with one embodiment of the present invention.

FIG. 6 is a screen shot of a Table of Contents page 600, which can be loaded, for example, when a user selects the TOC link 551B of FIG. 5. The Table of Contents page 600 contains a Title area 615, an Editor area 620, a Due Date area 630, and a Task area 640. The Title area 615 contains a book identifier "Calibrating Optical router PT67", the Editor area 620 contains the pull-down menu 625 from which an editor can be selected, and the Due Date area 630 contains a Due Date button (not shown). The Task area 640 contains an Insert New button 635 and other buttons (not shown). When the Due Date button is selected, a drop-down calendar 641 is displayed, indicated by a clock 642 on the scheduled due date. By selecting another date on the pull-down calendar 641, a new due date is scheduled.

Figure 7:
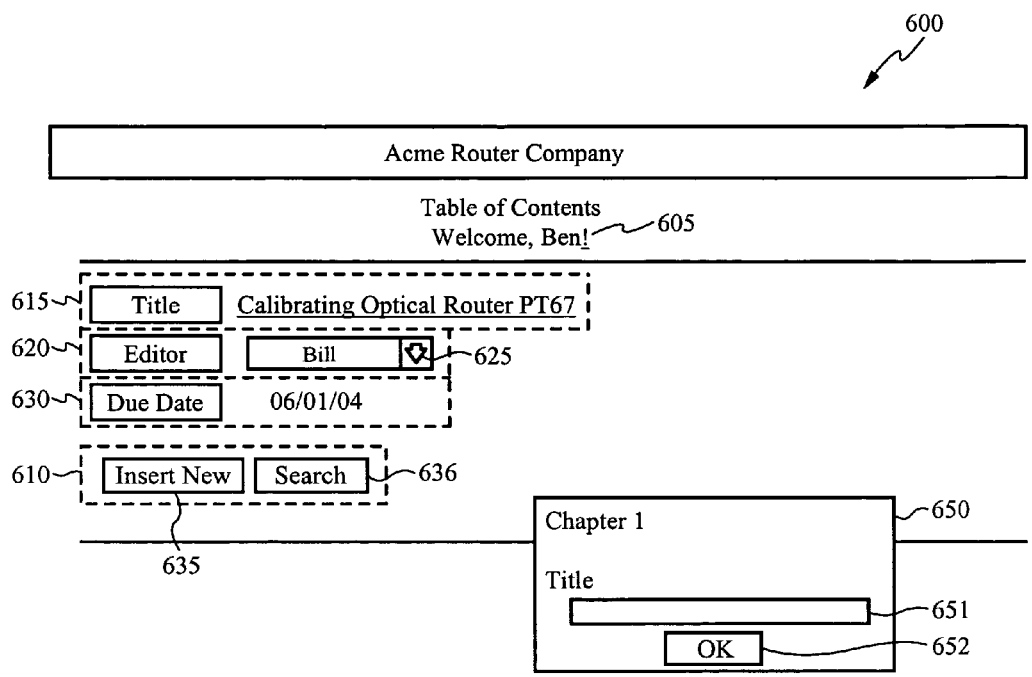
FIG. 7 is a screen shot of a Table of Contents for a book in accordance with one embodiment of the present invention.

FIG. 7 is a screen shot of the Table of Contents Page 600 after the Insert New Button 635 has been selected. As shown in FIG. 7, when the Insert New Button 635 has been selected, a pop-up 650 appears. The pop-up 650 contains a text area 651 for entering the title of a new chapter and an OK button 652 which the user selects after entering the title in the text area 651.

Figure 8:
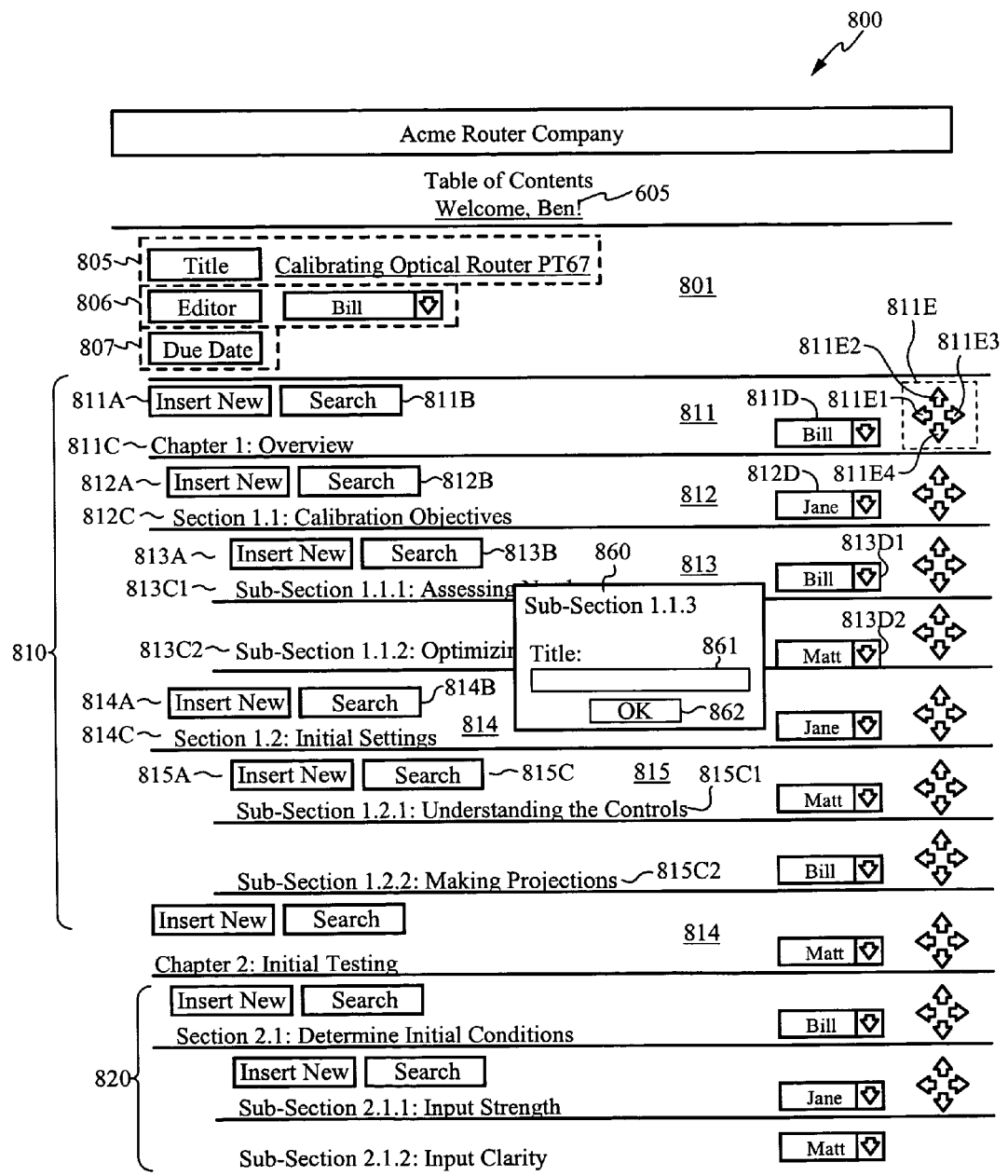
FIG. 8 is a screen shot of the Table of Contents shown in FIG. 7 with additional sections added to titles in accordance with one embodiment of the present invention.

FIG. 8 is a screen shot of a Table of Contents page 800 after multiple Chapters and sections have been added using the Insert New button 635 of FIG. 7. As shown in FIG. 8, The Table of Contents page 800 contains a Header area 801 and a plurality of sections 810 and 820. While FIG. 8 shows the Table of Contents page 800 containing two sections 810 and 820, it will be appreciated that the Table of Contents page 800 contains one section or more than one section if appropriate. The Table of Contents page 800 preferably contains more than two sections. In the embodiment shown in FIG. 8, each section corresponds to a chapter in a book, with each section containing sub-sections. It will be appreciated that each sub-section can itself contain sub-sections or other units of organization.

The Header area 801 contains a Title area 805, an Editor area 806, and a Due Date area 807, which have been explained above in reference to FIG. 7. The section 810 contains a first part 811, a second part 812, a third part 813, a fourth part 814, a fifth part 815, and a sixth part 816. As described below, the parts are organized hierarchically, as chapters and sections in a book. It will be appreciated that in accordance with the present invention, parts are alternatively organized using other relationships. The first part 811 contains an Insert New button 811A, a Search button 811B, a title "Chapter 1: Overview", an editor pull-down menu 811D, and a reorganization section 811E. The editor name shown in the editor pull-down menu 811D is shown as the user with the user identifier "Bill" but can be changed by selecting another user identifier using the pull-down menu 811D. Pull-down menus such as the pull-down menu 811D are used to assign each corresponding Chapter, Section, or Sub-section to a Writer or an Editor. Preferably, Editors also have access to this functionality. Everyone in the Administrator's group, including the Administrator, appears in this list. The reorganization section 811E has a left arrow button 811E1, an up arrow button 811E2, a right arrow button 811E3, and a down arrow button 811E4, each described in more detail below.

As shown in FIG. 8, the book is arranged in a tree hierarchical structure. The book contains parts 810 and 820. The part 810 contains a first part 811, containing a first sub-part 812 and a second sub-part 814. The first sub-part 812 contains two sub-parts, with titles in the fields 813C1 and 813C2. The second sub-part 814 contains a two sub-parts, with titles in the fields 815C1 and 815C2.

Each part of the book has an Insert New button and a Search button. When the Insert New button is selected, the system will generate a new part in the same hierarchical level as that of the section from which the Insert New button was pressed. Thus, for example, if the Insert New button 813A is selected, a pop-up menu 860 is displayed. The pop-up menu 860 is titled "Sub-section 1.1.3", indicating that the new section will be on the same level as the other parts in 813. After the user inputs a title into field 861 and selects the OK button 862, a new section 1.1.3 with the entered title is created and displayed in the Table of Contents page 800.

When a user selects the Search button 811B, a search page (FIG. 17) is displayed. Here, the user is able to search through all of the documents a client has created in the system, select text chosen from search results, and import the search result into the current book by selecting the "Add to Book" button (e.g., FIG. 18, elements 1821, 1822, or 1823). Thus, in accordance with the present invention, a user is able to import search results directly into an existing document, without copying and pasting. Thus, unlike prior art systems, a user within a first document does not have to search on a search term within a library of target documents, load a target document containing the search term, navigate to the location where the search term is located, copy the desired text, close the target document, reload or toggle to the first document, and paste the copied text into the desired location. These prior art steps will be repeated for each document within the library containing the search term. It will be appreciated that the methods and devices in accordance with the present invention obviate these steps, reducing document generation time and minimizing errors. Searching and importing search results in accordance with the present invention are discussed in more detail below, for example, in the discussion of FIGS. 17 and 18.

The reorganization section 811E allows a user to re-order chapters, sections, and sub-sections. The left-arrow key 811E1 and the right-arrow key 811E3 move the sub-section 1.2.3 within the hierarchy. For example, referring to FIG. 8, if the left-arrow key 811E1 is selected once, the sub-section 1.2.3 is made a section, on the same level in the hierarchy as "Chapter 1: Overview". Alternatively, if the right-arrow key 811E3 is selected once, the sub-section 1.2.3 will become a sub-section of its section, e.g. sub-section 1.2.3.1. When a user clicks once on the up-arrow key 811E2, the sub-section 1.2.3 is moved to a higher sub-section, thus becoming sub-section 1.2.2; the previous section 1.2.2 becomes the new sub-section 1.2.3. When a user clicks once on the down-arrow key 811E4, the sub-section 1.2.3 is moved to a lower sub-section, thus becoming sub-section 1.2.4; the previous section 1.2.4 becomes the new sub-section 1.2.3.

The pull-down menus 811D, 812D, 813D1, and 813D2 are used to allow an Administrator or Editor to assign each chapter, section, or sub-section to a writer or an editor. Each pop-down menu includes the name of everyone in an Administrator's group, including the Administrator.

Referring again to FIG. 5, when a user selects a book title, he is brought to a corresponding Book Overview page. Thus, for example, if the user selects the title identifier 555A "Calibrating Optical Router Model PT67", the Book Overview page 900 shown in FIG. 9 is automatically loaded and displayed to the user. The Book Overview page 900 has a Title area 905 and a plurality of entries 910, 915, 920, 925, and 930, arranged in a hierarchical fashion. The Book Overview page 900 also contains a Task area 960 and a Document area 970. The first entry 910 has a Title element 910A containing the text "Chapter 1: Overview", a Who element 910B containing the text "Bill", a "% Complete" element 910C containing a task bar indicating a 60% completion percentage for the entry, a "Date last Changed" element 910D containing the date Jan. 14, 2004, a "Comment Posted?" element 910E containing the text "No", a "Feedback Request?" element 910F containing the text "No", and an Approved element 910G containing the text "No". The entries are arranged in the same hierarchical fashion as shown in FIG. 8.

The Comment Posted element 910E refers to a comment that the writer input at the comments interface next to the creative interface on the Writing page 1300 (FIG. 13) that he or she is working on. Selecting the link opens the Writing page, with the section being discussed in the writing panel and the comment in the appropriate comment panel. Similarly, the Feedback Request element 910F means that the writer working on the section asked the Administrator (Ben) to read this and give feedback. Selecting the appropriate link preferably does the same thing as selecting the "Yes" link next to it, opening the Writing page with the section in question in the test box. The name is made a link so that the user can more easily find the feedback requests directed to him.

Elements contain text or identifiers. Thus, for example, the entry 930 has a "Comment Posted?" element 930E containing the Comment identifier Yes, which hides a link to a comment posted on another page. Thus, when a user selects the Yes identifier contained in the element 930E, the Web page containing the comment is automatically loaded so that the user is able to read it.

Figure 10:
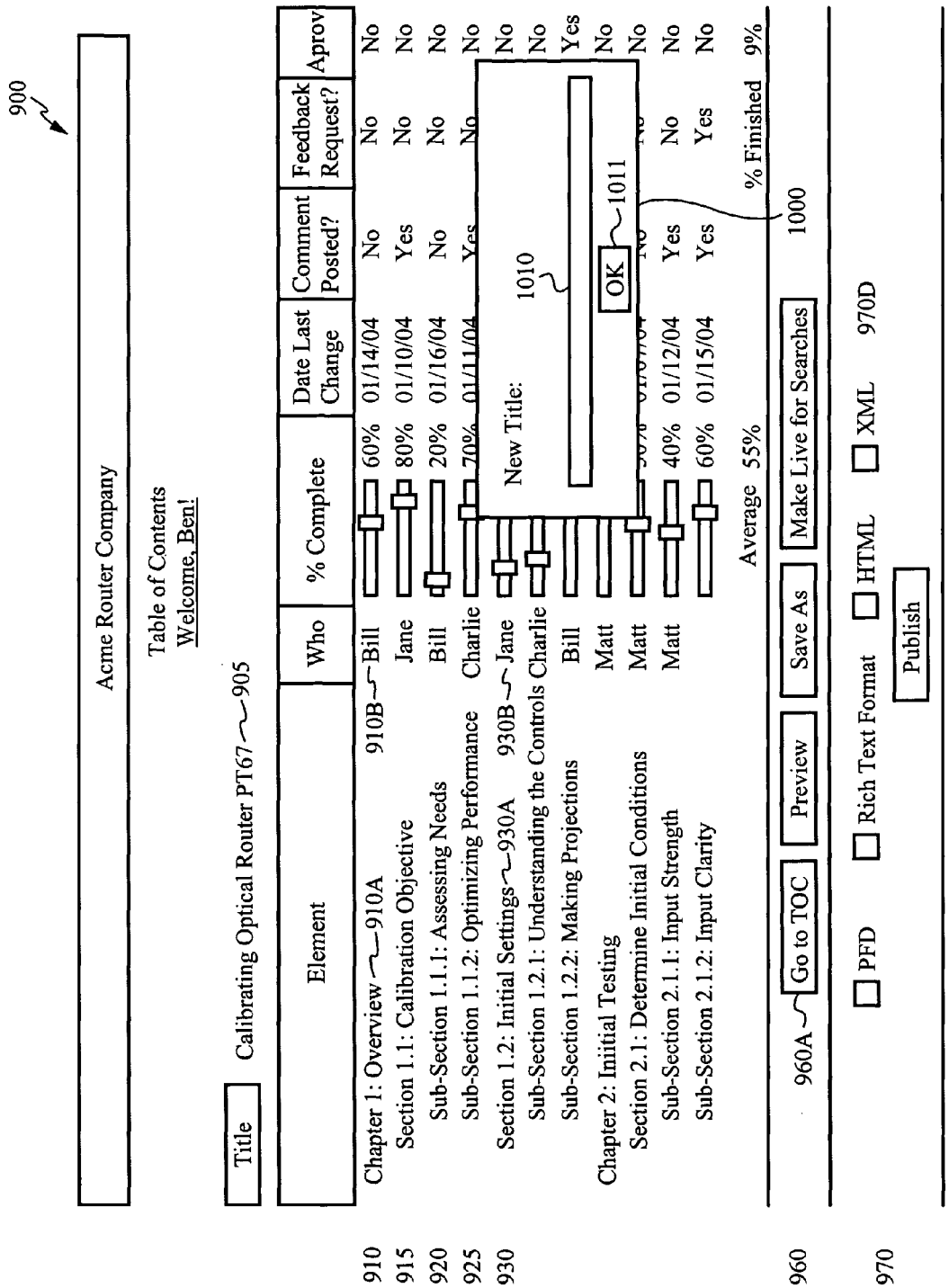
FIG. 10 is a screen shot of the Book Overview page of FIG. 9, including a pop-up window allowing the user to save a copy of the current book with a different title, commonly referred to as a "Save As" function, in accordance with one embodiment of the present invention.

The task area 960 contains a "Go to TOC" button 960A, a "Preview" button 960B, a "Save As" button 960C, and a "Make Live for Searches" button 960D. When a user selects the "Go to TOC" button 960A, the system will load the Table of Contents page for the current book. For example, if the user clicks on the "Go to TOC" button 960A, the Table of Contents page 800 shown in FIG. 8 will be loaded. When a user selects the "Preview" button 960B, the document, finished or not, will open as a Web page. If a user selects the "Save As" button 960C, a pop-up window 1000, shown in FIG. 10, will we displayed. As shown in FIG. 10, the pop-up window 1000 contains a text field 1010 and an "OK" button 1011. After the user enters a file or other name into the text field 1010 and selects the "OK" button 1011, an exact copy of the book currently accessed will be saved with the name input into the text field 1010. The copy includes the text and information about the book including comments and assignment status information.

Again referring to FIG. 9, if a user selects the "Make Live for Searches" button 960D, all of the content of the current book is available to a search engine for searching. Preferably, only the Administrator is able to use the "Make Live for Searches" button 960D.

Again referring to FIG. 9, a user is able to publish a book in multiple formats. For example, when a user highlights the PDF box 970A in the Publish area 970 and then selects the Publish button 970F, the current book is published in PDF format. Similarly, if the user highlights the Rich Text Format box 970B, the HTML box 970C, or the XML box 970D, and then selects the Publish button 970F, the current book will be published in RTF, HTML, or XML, respectively.

Figure 11:
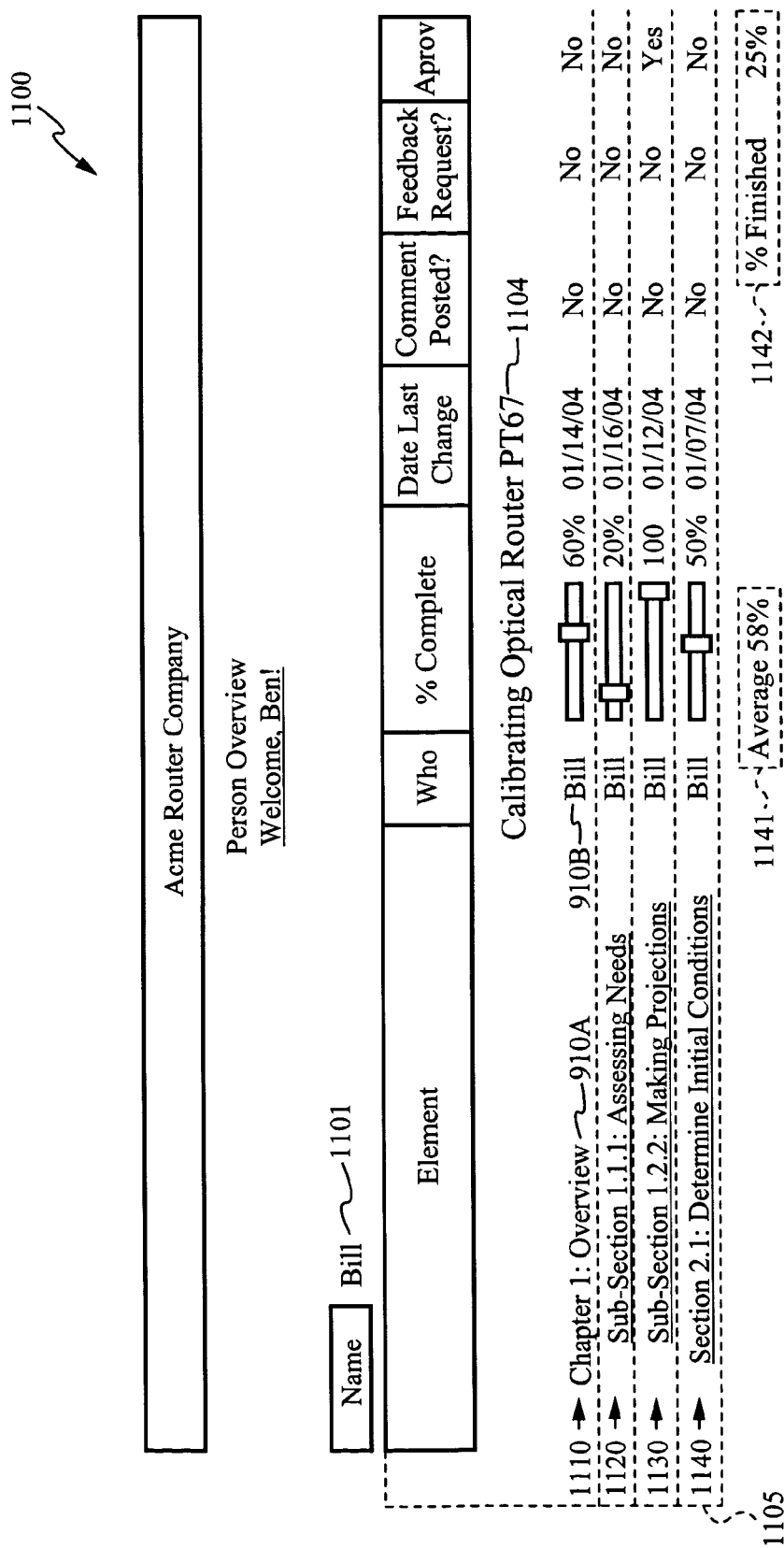
FIG. 11 is a screen shot of a Person Overview page in accordance with one embodiment of the present invention.

FIG. 11 shows a Person Overview page 1100 for the user Ben. A Person Overview page shows the status of each section in the current book assigned to a particular user. Thus, the Person Overview page 1100 contains a user name 1101 and a Book Overview section 1105. The Book Overview Section 1105 contains a title 1104 (here, "Calibrating Optical Router PT67") and a plurality of entries 1110, 1120, 1130, and 1140, an average completion area 1141 and a finished completion area 1142. The Book Overview Section 1105 shows the sections of a book, in a hierarchical structure, similar to that shown in FIG. 8. Each entry has a "Title" element, a "Who" element, a "% Complete" element, a "Date Last Changed" element, a "Comment Posted?" element, a "Feedback Request?" element, and an "Approved" element. Each of these elements is similar to similarly named elements in FIG. 9 and will not be further discussed in detail here. It will be noted that the Title elements in FIG. 11 contain Title identifiers, allowing a user to load the corresponding Web page by selecting the identifier.

FIG. 12 is a screen shot of a Writer's Home page 1200 for the user with the user identifier "Matt". The Writer's Home Page 1200 contains a What's Up area 1210 and a Status area 1220. The Status area 1220 contains a plurality of entries including entry 1222. The entry 1222 contains elements similar to those discussed above in relation to FIG. 11. Underlined elements are links to sections that the user Matt is working on.

Selecting the underlined element will open the element in Matt's Writing page. Thus, for example, the Title element 1222A contains a title "Chapter 2: Initial Testing". Selecting the title identifier 1222A will open the identified section in Matt's Writing page. Thus, selecting the identifier "Chapter 2: Initial Testing" will load the Writing Page 1300 shown in FIG. 13.

The Writing Page 1300 contains a link 1301 containing a URL to the page for "Calibrating Optical Router PT67", a link TOC 1302 to the table of contents for the book "Calibrating Optical Router PT67", a slider status bar 1307 which a user can slide to indicate how much of the section he has completed, a text section 1310, a function area 1320, a first comment section 1330, a second comment section 1340, a select drop-down menu 1341 and a post button 1342. The text section 1310 contains the text for the section titled "Chapter Two: Initial Testing". Within the function area 1320, the B button 1320A, the I button 1320B, and the U button 1320C are used to bold, italicize, and underline, respectively, portions of text within the text section 1320 that the user has highlighted. The Insert Image button 1320D is used to insert an image at a location within the text section 1310 that the user has selected, preferably by placing the cursor at the location. The Insert Footnote button 1320E is used to insert a footnote at a location within the text section 1310. The Insert Table button 1320F is used to insert a table at a location within the text section 1310. The Insert file button 1320G is used to insert a file at a location within the text section 1310. The Spell Check button 1320H is used to check the spelling of words, the Save/Preview Chapter button 1320I is used to save and display in a Web format, and the Save button 1320J is used to save the text within the text section 1310. The first comment box 1330 displays a comment from the user with the user identification Bill, and the New comment box 1340 provides an area that the current user (here, Matt) can input a comment. The To pull-down menu 1341 is used to select a user that the new comment in the New comment box 1340 will be addressed to. The new comment will be posted when the user selects the Post button 1342.

Figure 13:
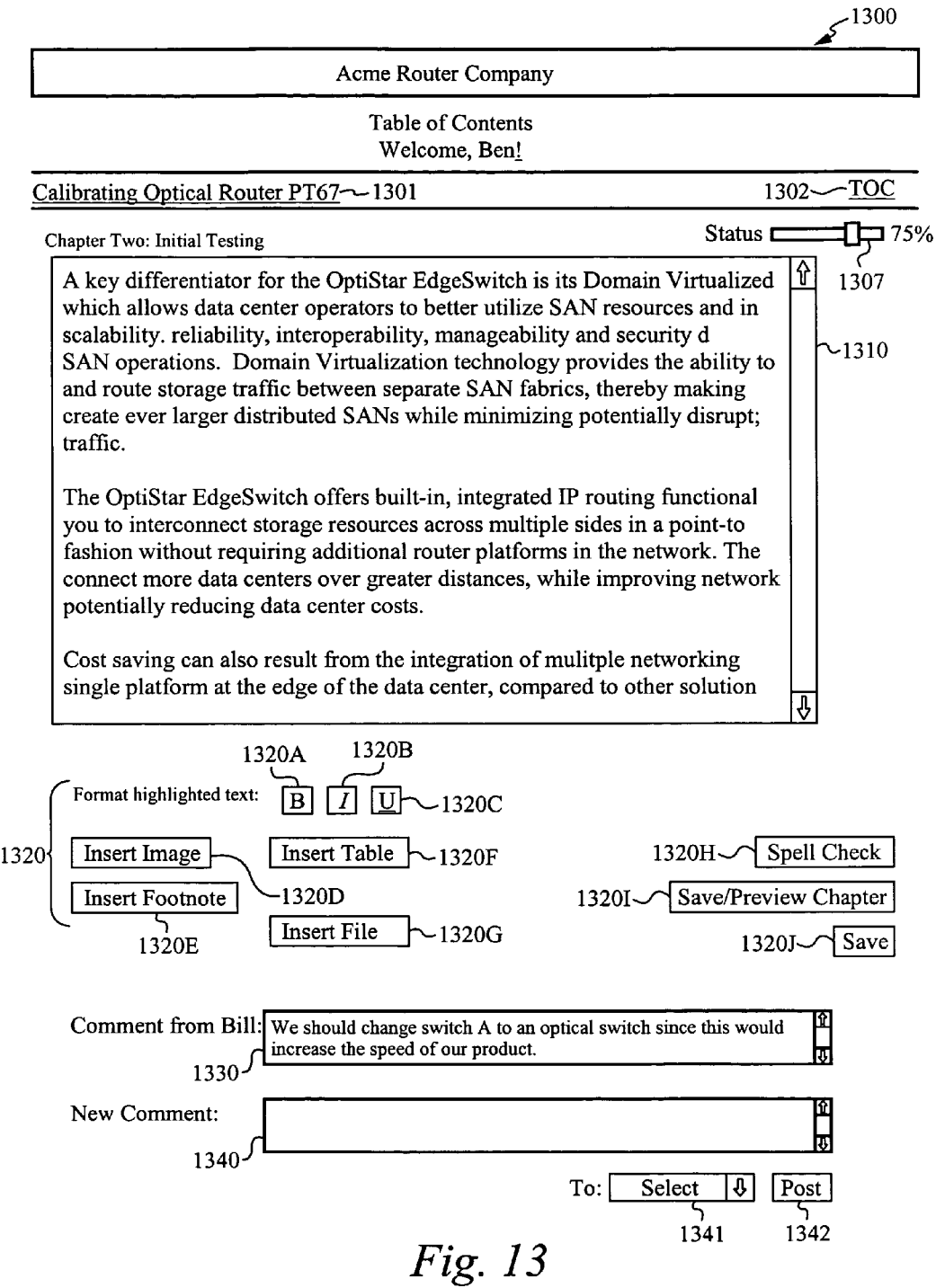
FIG. 13 is a screen shot of a Writing page in accordance with one embodiment of the present invention.
Figure 14:
FIG. 14 is a screen shot of the Writing page shown in FIG. 13, with a pop-up window for a spell checker in accordance with one embodiment of the present invention.

FIG. 14 displays a Writer's page 1400, which represents the Writer's page 1300 after the user has selected the Spell Check button 1320G shown in FIG. 13. The Writer's page 1400 contains a pop-up window 1401 underlining misspelled words and allowing the user to replace a single occurrence of the misspelling or multiple occurrences of the same misspelling. FIG. 15 displays a Writer's page 1500, the Writer's page 1300 after the user has selected the "Insert Image" button 1320D shown in FIG. 13. As shown in FIG. 15, the user placed a cursor at the location 1509, selected the "Insert Image" button 1320D, and selected an image from a selection of images (not shown) presented to the user. After the user selected an image, the application puts at the chosen location the note: "Image: Photo of Back of Optical Router PT67". The application also places a link to the image in the list 1550. If the user selects the link, an "Insert Image" interface (not shown) will be loaded from which the user can change the caption or the image.

FIG. 16 shows a Table Interface 1600 that pops up over the Writing page 1300 when a user selects the Insert Table button 1320F of FIG. 13. The Table Interface 1600 contains a drop-down menu that allows a user to format the rows, columns, borders cell padding, cell border, and table width for the table.

It will be appreciated that footnotes and tables are inserted into text in a format similar to that for inserting images. For example, if a table were embedded into the text, a message such as "Table: Settings and Variables for Initial Conditions" would be inserted into the text at a location where the table is to appear. A link to the table would be placed below the text area.

Figure 17:
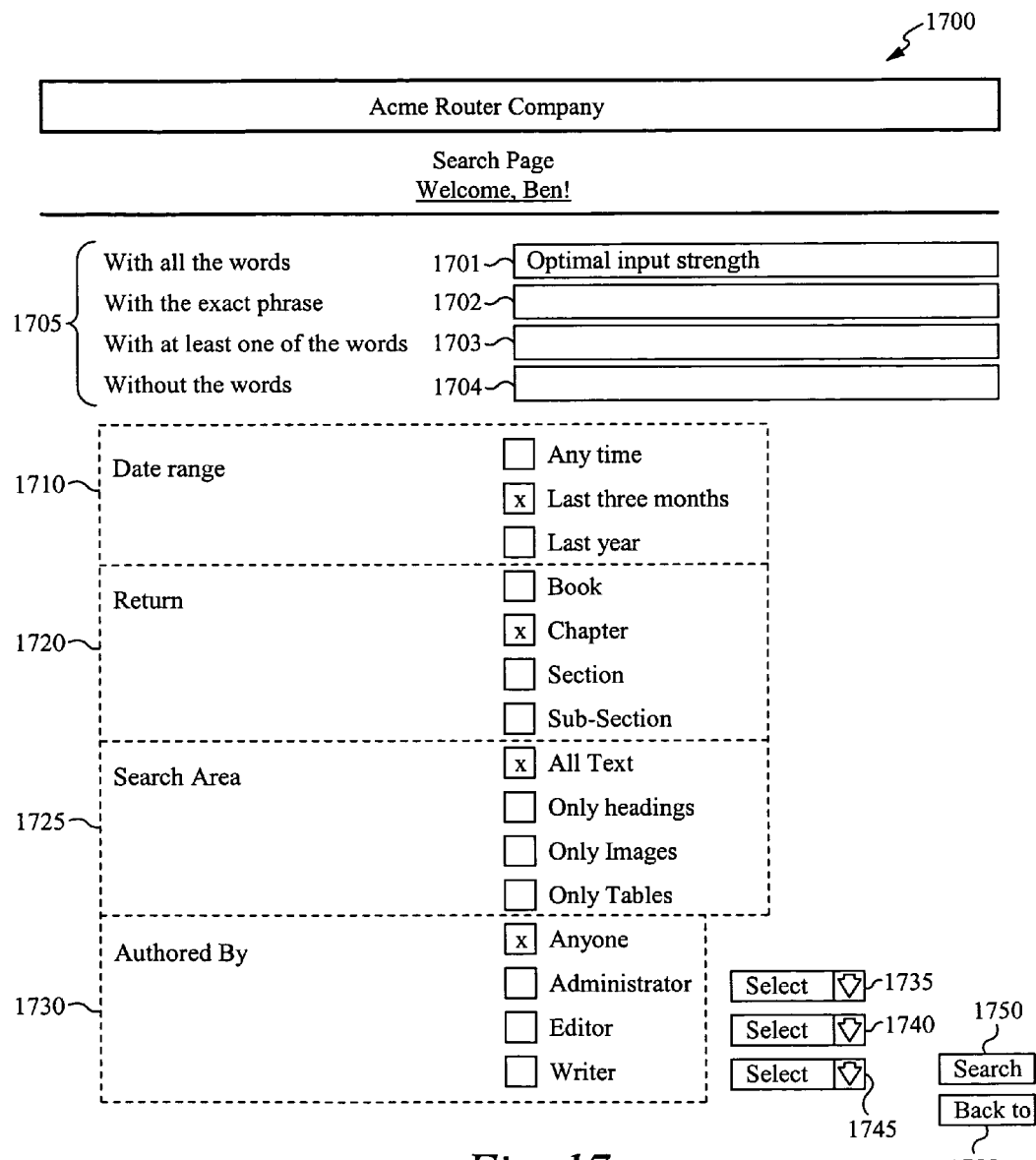
FIG. 17 is a screen shot of a Search page in accordance with one embodiment of the present invention.

FIG. 17 shows a Search page 1700 that is loaded when a user searches through a book by, for example, selecting the Search button 636 of FIG. 7. The Search page 1700 contains a Search Term section 1705, a Date Range section 1710, a Return section 1720, a Search Area section 1725, an Authored By section 1730, a Search button 1750, and a Back to Top button 1755. In operation, a user is able to retrieve documents within the system (1) that contain one or more words by entering the words into the "With all the Words" text area 1701 of the Search Term section 1705, (2) that contain an exact phrase by entering the phrase into the "With the exact phrase" text area 1702, (3) that contain at least one word from among a group of words by entering the words into the "With at least one of the words" text area 1703, (4) that do not contain one or more words by entering the one or more words into the "Without the words" text area 1704, or (5) any combination of 1 through 4. In the example shown in FIG. 1700, documents will be searched to find any that have the words "optimal" and "input" and "strength", preferably by using a Boolean AND search.

The user has the ability to select the date of the documents to be searched by selecting one of the check boxes in the Date Range area 1710. In FIG. 1700, the "Last three months" check box has been selected, instructing the system to search only those documents that were created within the last three months. Alternatively, the system would have checked within the system for documents that were created at any date or those created within the last year if the "Any time" check box or the "Last year" check box, respectively, were checked.

The user is able to select what document elements are returned by the search by checking an appropriate box in the Return area 1720. For example, the system can return the title of the book, the title of a chapter, the title of a section, or the title of a sub-section where the search terms were found. In FIG. 1700, the "Chapter" check box has been selected, indicating that the search will return the chapter where the search terms were found. The user is able to select what areas within a document are searched by the search engine by selecting the appropriate box within the Search Area 1725. For example, all of the text within a document, only headings, only images, or only tables can be searched. In FIG. 1700, the "All Text" check box has been selected, indicating that all of the text within a document will be searched. By selecting the appropriate box in the Authored By section 1730, the user is able to instruct the search engine to search documents written only by selected authors. For example, the search engine is able to search documents written by anyone, by an administrator (chosen using the pull-down menu 1735), by an editor (chosen using the pull-down menu 1740), or by a writer (selected using the pull-down menu 1745). In FIG. 1700, the "Anyone" check box has been selected, indicating that the documents written by any author and satisfying the other search criteria will be searched. The search is initiated by selecting the Search button 1750.

Figure 18:
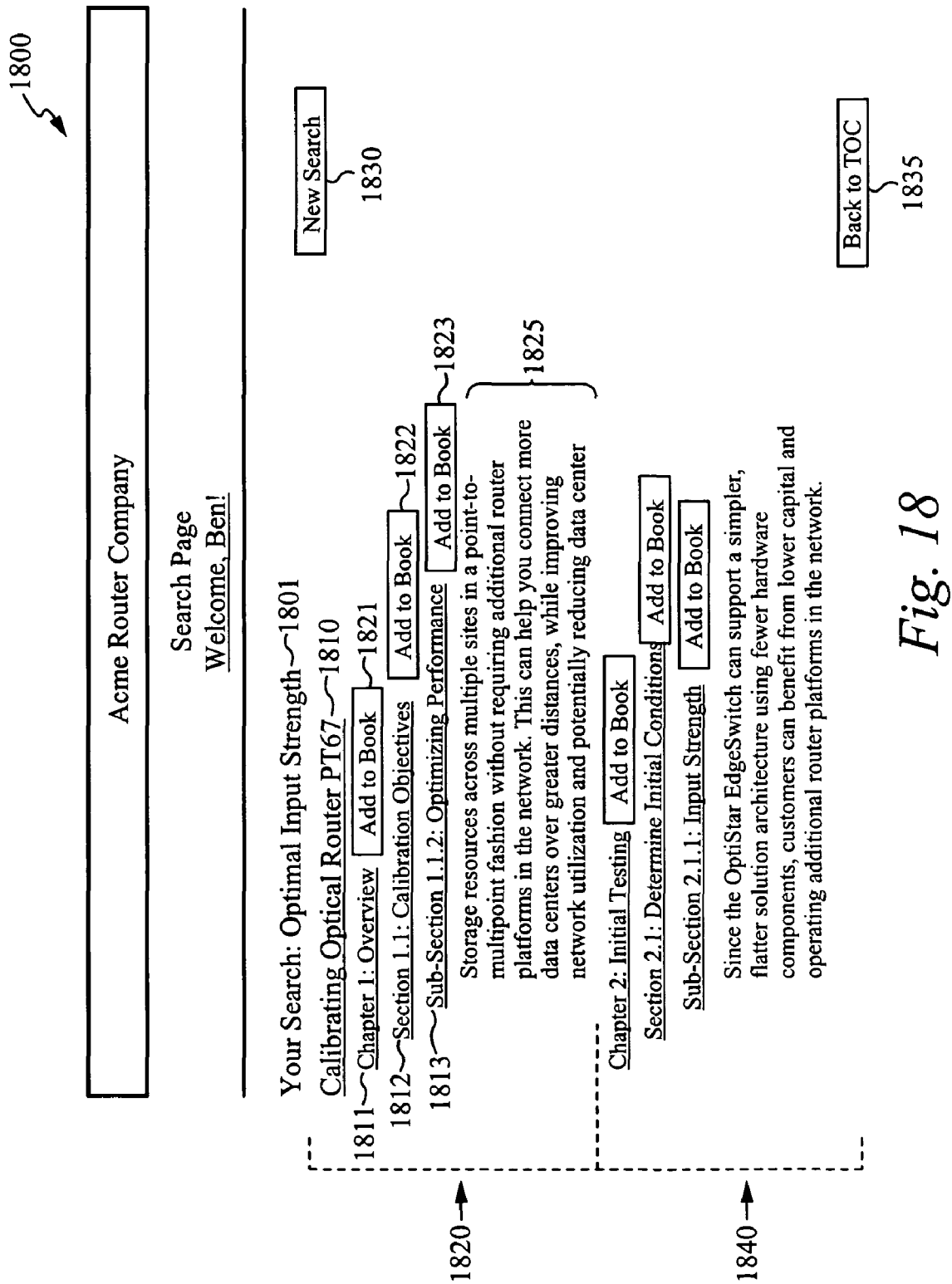
FIG. 18 is a screen shot of the result of running a search query, having the search criteria shown in FIG. 17, and showing the buttons that the user can use to import search results into an existing or new book, in accordance with one embodiment of the present invention.

FIG. 18 shows a Search Result page 1800 for a search performed using the search criteria in FIG. 17. The Search Result page 1800 shows the search phrase 1801 entered in the field 1701 of FIG. 17, a first result 1820 and a second result 1840. The first result 1820 shows the book title 1810, chapter title 1811, section title 1812, and sub-section title 1813 for the section containing the search terms. The first few words of the result are also shown in a Result Text Area 1825. Section 1840 of FIG. 18 also shows that "Chapter 2: Initial Testing", "Section 2.1 Determine Initial Conditions", "Sub-Section 2.1.1:

Input Strength" also contains the search term. "Chapter 1: Overview" can be imported into the current book by selecting the "Add to Book" button 1821; "Section 1.1: Calibration Objectives" can be added to the current book by selecting the "Add to Book" button 1822; and "Sub-Section 1.1.2: Optimizing Performance" can be added to the current book by selecting the "Add to Book" button 1823.

If the user selected the "Add to Book" button 1822, the application would save the heading and text for Section 1.1 and the heading and text for Sub-section 1.1.2. It would create a footnote at the end of each text showing normal footnote information for the source document. The headings would automatically appear in the Table of Contents of the book the user is creating, but with no one assigned to them.

The user is able to perform a new search or return to the table of contents by selecting the "New Search" button 1830 or the "Back to TOC" button 1835, respectively.

In accordance with the present invention, a secondary user (e.g., a user other than an Writer, Editor, or Administrator) has the ability to search through documents within a system library but does not have access to the application. Thus, the secondary user can not write documents, edit documents, or perform administrative tasks relating to the documents. This secondary user must be registered and is given a session-specific ability to generate a booklet, which is a collection of search results that are published. Preferably, the system is configured to determine whether a secondary user has registered on a specific Web site and is accordingly able to access the search engine and any booklets. Alternatively or additionally, the system is configured to generate a separate registration page from which a secondary user registers and then accesses the search engine and any booklets. In contrast to a secondary user, as used herein the term "primary user" refers to a user that has access to the applications of the system. The term primary user thus refers to any one of an Administrator, an Editor, and a Writer.

Figure 20:
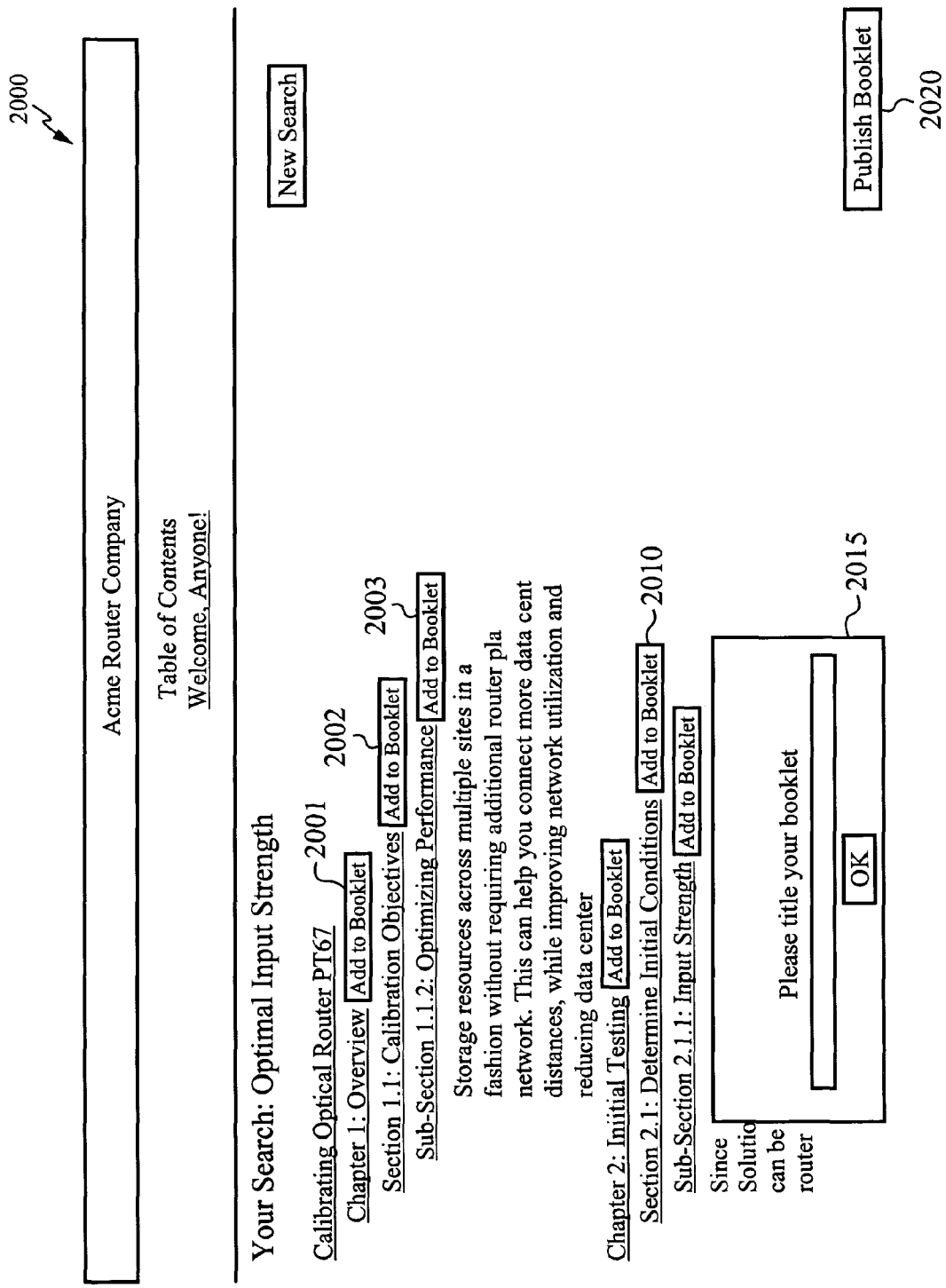
FIG. 20 is a screen shot of a results page from which a secondary user can generate a booklet, a collection of search results.

FIG. 19 shows a Search Page (also called a Booklet) 1900 available to a secondary user. The Booklet 1900 is similar to the Search Page 1700, but has a "Publish Booklet" button 1910. After the secondary user enters the search criteria in a manner similar to that for the Search Page 1700 and selects the "Search" button 1908, the Booklet 2000 shown in FIG. 20 is loaded and displayed. When search results are returned, as shown in the Booklet 2000, each result is followed by an "Add to Booklet" button, such as the "Add to Booklet" buttons 2001, 2002, 2003, and 2010. Selecting any "Add to Booklet" button will cause the search result to be included in a session-specific PDF document. For example, selecting button 2001 will cause all of Chapter 1 and its sub-sections to be included in the secondary user's Booklet. Selecting button 2010 will cause Section 2.1 and all of its sub-sections to be included in the Booklet as well. Selecting the "Publish Booklet" button 2020 will allow the secondary user to download a PDF containing his search results. After selecting the "Publish Booklet" button 2020, the pop-up display 2015 will appear, allowing the secondary user to title the Booklet.

FIG. 21 shows a Table 1 of entries 2101-2123 for XML tags that are generated when a user creates a document in accordance with embodiments of the present invention. Two element entries contain an XML tag in the left-hand column and examples of sections relating to these entries. Thus, for example, entry 2101 shows the XML tag <book>that would be assigned to the book titled "Calibrating Optical Router PT67". XML tags are automatically generated and inserted into the text when a user creates a section or other element. These XML tags allow a search engine to more efficiently search through a document and also allow a customized Web browser to render the formatted document correctly. For example, if a user chooses to search only images by, for example, selecting the check box "Only Images" in the Search Area 1725 in FIG. 17, the search engine will perform searches only within the <image></image>tags, whose opening tag is shown in entry 2115 of Table 1.

It will be appreciated that documents can be formatted in ways other than by using the XML tags shown in FIG. 21. For example, documents can be formatted using HTML tags, using control words used in RTF, to name a few formats that can be used in accordance with the present invention. Alternatively, documents do not have to be formatted but can contain unformatted text.

In operation, a user logs into the system and is brought to his home page. A first user, a Writer, logs in from a remote client location, where he is troubleshooting a router. He searches through documents in the system library for documents containing chapters on "How to Troubleshoot a Router." He finds these chapters by navigating to a search screen and entering the search terms "Troubleshoot" and "Router" or by entering the search phrase "How to Troubleshoot a Router." The user then imports the relevant chapters found by his search request into a Booklet, publishes the Booklet in PDF format, and prints the Booklet.

Figure 22:
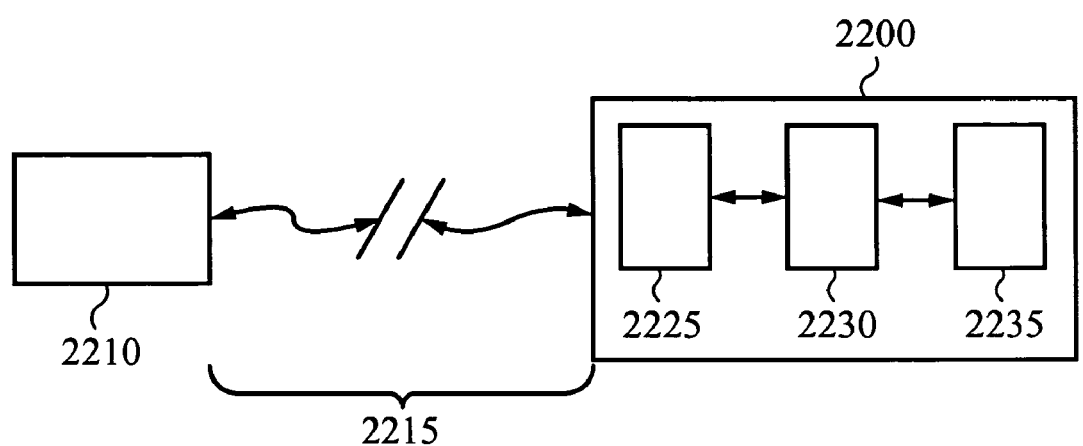
FIG. 22 is a block diagram of a system in accordance with the present invention.

FIG. 22 is a block diagram of a system 2200 in accordance with one embodiment of the present invention. The system 2200 is coupled to a user host 2210 over a connection 2215. The connection 2215 is (1) an internal connection such as when the user host 2210 runs on the same platform as the system 2200, (2) a local area network connection such as used for an Ethernet LAN, (3) a wide area network connection such as used to connect hosts over the Internet, or (4) any other type of connection between two hosts. Preferably, the connection 2215 is a wide area connection comprising the Internet. The system 2200 comprises an interface 2225 coupled to a suite of application programs 2230, which is coupled to a data repository 2235. Preferably, the user host 2210 executes a Web browser and the system 2200 operates as a Web server. In the preferred embodiment, the interface 2225 is a Web-based interface. It will be appreciated that the interface 2225 can be another type of interface used to provide a graphical or other interface to the user host 2210.

The data repository 2235 contains (1) documents (e.g., books) stored in a database, in XML formats, or in any other format suitable to store, retrieve, and edit documents, (2) document workflow information used to assign and track workflow for each document, (3) other information relating to documents including, but not limited to, comments and other files. The suite of application programs 2230 satisfies user requests through the interface 2225 to store, retrieve, edit, search through, and perform other functions on documents stored in the document repository 2235. The suite of application programs 2230 also generates data to track and update progress on the documents. Thus, the suite of application programs can retrieve a document stored in the data repository 2235, update comments related to the document and retrieved when the document is retrieved, generate current tracking and status information relating to the document, such as a new writer or due date, and perform other functions. The suite of application programs 2230 thus preferably comprises a document control portion for, among other things, editing the document and a workflow control portion for, among other things, tracking the workflow related to the document.

In operation, for example, a user on the user host 2210 generates a request to edit a portion of a document (e.g., a book section). In one embodiment, the request is generated by selecting an identifier such as a title of a book section. The request, which consists of a link to the book section, is transmitted over the connection 2215 to the interface 2225. The interface 2225 extracts the link and passes it to the suite of application programs 2230. The suite of application programs 2230 retrieves the book section from the data repository 2235 and passes the book section on to the interface 2225. For example, if the book section is stored in a database in the document repository 2235, the suite of application programs 2230 formats an SQL command to retrieve the book section. If the book section is stored as a dynamic document, the suite of application programs 2230 generates the book section, passes it on to the interface 2225, which then transmits it to the user host 2210 over the link 2215.

In one embodiment, the interface 2225 is a part of the suite of programs 2230. In other embodiment, the data repository 2235 is distributed across multiple hosts. Other embodiments are envisioned in accordance with the present invention.

It will be readily apparent to one skilled in the art that other modifications can be made to the embodiments without departing from the spirit and scope of the invention as defined by the appended claims.

I claim:

1. A system comprising a non-transitory computer-readable medium containing instructions for execution by a processor, the instructions comprising:
   a document control module comprising a document engine for generating separate parts of a document, wherein the document engine comprises a search engine to search within the separate parts for a target using search criteria;
   a workflow control module for assigning users to write or edit the separate parts and setting corresponding completion dates; and
   a Web-based interface coupled to the document control module and the workflow control module, the Web-based interface to concurrently display a title for each of the parts and a list of selectable users for assigning to each of the parts.

2. The system of claim 1, wherein the workflow control module provides a plurality of sets of functions to be performed on the parts of the document, each set of functions corresponding to a type of a user.

3. The system of claim 2, wherein a first type of user has a corresponding first set of functions, the first set of functions comprising adding a user to the system, adding to the system a book capable of being updated electronically with text and images, and assigning work to a user to write or edit parts of the book.

4. The system of claim 3, wherein a second type of user has a corresponding second set of functions, the second set of functions comprising assigning work to a user and opening a part of a book for writing and editing.

5. The system of claim 4, wherein a third type of user has a corresponding third set of functions, the third set of functions comprising writing a part of the book and reporting a completion status for work on the part of the book.

6. The system of claim 1, wherein the workflow control module comprises a plurality of panels, each panel associated with a workflow for one or more parts of the document.

7. The system of claim 6, wherein a first panel from the plurality of panels contains an identifier corresponding to a location of a second panel from the plurality of panels.

8. The system of claim 7, wherein the identifier comprises a link to the second panel.

9. The system of claim 8, wherein the first panel comprises a first Web page, the second panel comprises a second Web page, and the link comprises a uniform resource locator for the second Web page.

10. The system of claim 6, wherein at least one of the plurality of panels comprises a comment field.

11. The system of claim 1, wherein the document comprises markers.

12. The system of claim 11, wherein the markers correspond to headings within the document.

13. The system of claim 11, wherein the markers comprise SGML tags.

14. The system of claim 13, wherein the SGML tags are XML tags.

15. The system of claim 13, wherein the SGML tags are HTML tags.

16. The system of claim 11, wherein the markers are rich text format control words.

17. The system of claim 11, wherein the document engine comprises a formatting engine configured to automatically embed the markers within the document at locations selected by a user from the Web-based interface.

18. The system of claim 1, further comprising a host coupled to the Web-based interface, the host configured to execute a Web browser.

19. The system of claim 18, wherein the host is coupled to the Web-based interface over a local area network.

20. The system of claim 18, wherein the host is coupled to the Web-based interface over a wide area network.

21. The system of claim 20, wherein the wide area network comprises the Internet.

22. The system of claim 18, wherein the host is coupled to the Web-based interface over a secure channel.

23. The system of claim 22, wherein the secure channel comprises a virtual private network.

24. The system of claim 1, wherein the document engine is configured to import an object into the document in response to a command received on the Web-based interface.

25. The system of claim 24, wherein the object comprises at least one of a sound file, an image file, a table, and a video clip.

26. The system of claim 1, wherein the workflow control module comprises a Library area containing a book identifier, a corresponding status display, and a corresponding due date.

27. The system of claim 1, wherein the workflow control module comprises a Book Overview panel containing a plurality of entries, each entry having a title area, a user owner area, and a status area.

28. The system of claim 27, wherein the status area contains a completion percentage area.

29. The system of claim 1, wherein the document control module comprises a publishing engine configured to publish the document in a format selected by a user.

30. The system of claim 29, wherein the selected format is one of PDF, Rich Text Format, HTML, and XML.

31. The system of claim 1, wherein the search criteria comprises at least one of a date range, a search term, a search area, a user type, and a user identity.

32. The system of claim 31, wherein the user type is one of an administrator, an editor, and a writer.

33. The system of claim 31, wherein the search engine is configured to display a location within the document where the search term is found.

34. The system of claim 33, wherein the search engine is configured to display a marker and text corresponding to the location of the search term within the document.

35. The system of claim 34, wherein the marker corresponds to a heading within the document.

36. The system of claim 35, wherein the heading corresponds to at one of a book heading, a chapter heading, a section heading, and a sub-section heading of a book.

37. The system of claim 36, wherein the search area is one of text, a heading, an image, and a table.

38. The system of claim 36, wherein the document control module is configured to import the result of one or more searches into the document.

39. The system of claim 38, wherein the Web-based interface is configured to allow both a primary user and a secondary user to access the search engine.

40. The system of claim 39, wherein the system is configured to collect one or more results of searches into a booklet.

41. The system of claim 40, wherein the system is configured to format the booklet and transmit the formatted booklet to a host computer.

42. The system of claim 41, wherein the formatted booklet is a PDF file.

43. The system of claim 1, wherein when one of the list of selectable users is assigned to a part, the Web-based interface displays the assigned user when displaying the part.

44. A system comprising:
a computer device comprising a document control module, a workflow control module, and a Web-based interface coupled to the document control module and the workflow control module, wherein the document module comprises a document engine to generate a hierarchically organized multiple-part document and to access each of the multiple parts of the document, the workflow control module to assign users for writing or editing the multiple parts and to set corresponding completion dates, and the Web-based interface to concurrently display a title for each of the parts and a list of selectable users for assigning to each of the parts, the document engine further comprising a communications module to communicate workflow information.

45. The system of claim 44, wherein the workflow control module is also to track ranges of progress on the writing or editing of the multiple parts.

46. The system of claim 44, wherein the workflow control module displays titles of the multiple parts in a hierarchical manner.

47. The system of claim 46, wherein the titles are links to the parts.

48. A system comprising:
a workflow control module comprising a non-transitory computer-readable medium containing computer-executable instructions for selecting titles for parts of a document, arranging the parts in a user-selectable hierarchical structure, assigning work on the parts to one or more users, and tracking a range of progress of the work;
a document control module comprising a document engine comprising a non-transitory computer-readable medium containing computer-executable instructions for changing content in the parts of the document and displaying the content; and
a Web-based interface for accessing the workflow control module and the document control module, the Web-based interface to display a title for each of the parts and a list of selectable users for assigning to each of the parts.

49. The system of claim 48, wherein each title is linked to an associated user page for displaying and changing a corresponding part of the document.

50. The system of claim 48, wherein the workflow control module comprises a page that displays, for each of the parts, a title identifier selectable to access the part, a continuous completion status, and a due date.

51. The system of claim 48, wherein the workflow control module comprises a single interface operable to insert new parts into the document, rearrange the hierarchical structure of the parts, and to search within the parts for content.

52. The system of claim 51, wherein the hierarchical structure is designated by headings and sub-headings.

\* \* \* \* \*